United States Patent [19]

Havens et al.

[11] Patent Number: 5,064,699
[45] Date of Patent: Nov. 12, 1991

[54] SEMI-RIGID HEAT-SEALABLE LAMINATES WITH PERMANENT ANTISTATIC CHARACTERISTICS

[75] Inventors: Marvin R. Havens, Greer; Stephen L. Fowler, Moore, both of S.C.; William P. Roberts, Columbia; Cynthia L. Ebner, Mt. Airy, both of Md.

[73] Assignee: W. R. Grace & Co.-Conn., Duncan, S.C.

[21] Appl. No.: 489,411

[22] Filed: Mar. 6, 1990

Related U.S. Application Data

[63] Continuation-in-part of Ser. No. 354,069, May 19, 1989, abandoned.

[51] Int. Cl.⁵ ............ B65D 25/14; B32B 23/08; B32B 27/32
[52] U.S. Cl. .................. 428/35.7; 206/328; 206/464; 252/510; 428/34.2; 428/80; 428/500; 428/512; 428/514; 428/522
[58] Field of Search .......... 428/35.7, 34.2, 500, 428/512, 522, 514, 80; 206/328, 464; 252/510

[56] References Cited

U.S. PATENT DOCUMENTS

| | | | |
|---|---|---|---|
| 4,599,366 | 7/1986 | Kesling, Jr. et al. | 521/57 |
| 4,623,564 | 11/1986 | Long et al. | 427/393 |
| 4,623,589 | 11/1986 | Simmonds, Jr. | 428/403 |
| 4,707,414 | 11/1987 | Long et al. | 428/511 |

FOREIGN PATENT DOCUMENTS

| | | |
|---|---|---|
| 2407942 | 1/1979 | France . |
| 60-240704 | 11/1985 | Japan . |
| 61-2703 | 1/1986 | Japan . |
| 61-4736 | 1/1986 | Japan . |
| 61-44646 | 3/1936 | Japan . |
| 61-163853 | 7/1986 | Japan . |
| 938729 | 10/1963 | United Kingdom . |
| 2028168A | 3/1980 | United Kingdom . |

Primary Examiner—James J. Seidleck
Attorney, Agent, or Firm—John J. Toney; William D. Lee, Jr.; Jennifer L. Skord

[57] ABSTRACT

A semi-rigid, heat-sealable laminate with permanent antistatic characteristics comprising a semi-rigid packaging material having a coating of heat-sealable antistatic plastic. The antistatic plastic is a film of a modified acid copolymer. The modified acid copolymer is selected from (I) a mixture of (A) a polymer containing carboxylic acid moieties and (B) an antistatically effective amount of a quaternary amine, or (II) the acid/base reaction product of (A) a polymer containing carboxylic acid moieties and (C) an antistatically effective amount of an organic or inorganic base.

19 Claims, 2 Drawing Sheets

SEMI-RIGID HEAT-SEALABLE LAMINATES WITH PERMANENT ANTISTATIC CHARACTERISTICS

This application is a continuation-in-part of U.S. Ser. No. 354,069, filed May 19, 1989 now abandoned.

The present invention involves antistatic packaging laminates and methods of producing such laminates, and more particularly a packaging laminate comprising a semi-rigid substrate sheet of packaging material such as cardboard which is coated with a layer of heat-sealable, antistatic plastic. The structure provides both mechanical support for a staticsensitive item to be packaged and a permanent antistatic shield to protect the item from static build-up while it is being packaged, and during shipment. Typical static sensitive items to be packaged are electronic circuit boards. Furthermore, the heat-sealable plastic coating permits a flexible antistatic skin film to be heat sealed to the laminate if so desired, so that it may be employed in skin-packaging systems. A problem in the past has been that coated cardboard used during skin packaging was not permanently antistatic.

This problem is solved by the present invention, which relates to a semi-rigid substrate sheet of packaging material, such as cardboard or fiber board, having a coating of heat-sealable permanently antistatic plastic. The coating of heat-sealable antistatic plastic comprises a layer of a modified acid copolymer. The "modified acid copolymer" is selected from:

(I) a mixture of (A) a polymer containing carboxylic acid moieties and (B) an antistatically effective amount of a quaternary amine; or (II) the acid base reaction product of (A) a polymer containing carboxylic acid moieties and (C) an antistatically effective amount of an organic or inorganic base.

The coating layer has permanent, non-bleeding antistatic characteristics. By "permanent, non-bleeding" antistatic characteristics is meant that even after a 24-hour water shower, and/or after 12 day hot oven aging at about 70° C., the coating layer exhibits a static decay time (hereinafter abbreviated as SDT) under about 3000 milliseconds (hereinafter abbreviated as ms) when the SDT test using 5000 volts direct current (hereinafter abbreviated as Vdc) is performed as per Federal Test Method 101c, Method 4046.1, i.e. the antistatic property is not washed out by the shower and/or is not lost after 12 days in a hot (approximately 70° C.) oven. The Federal Test Method requires that the SDT test be performed in a "dry" atmosphere, i.e. about 15% relative humidity or less. A problem with prior antistatic coatings is they need a typical ambient atmosphere of 40 to 50% RH to work, and they behave as insulators under "dry" conditions of 15% RH or less. In a preferred embodiment, the present coating layer exhibits a low propensity toward triboelectric charge generation.

BACKGROUND OF THE INVENTION

When two surfaces are brought in contact with each other, a transfer of electrons may occur resulting in a residual static electrical charge when the surfaces are separated. This phenomenon is known as triboelectricity. A common example is the static a person feels after shuffling along a carpet and then touching a metal door knob. If the surface is composed of a material that is a conductor, the electrons will dissipate quickly thereby eliminating the excess charge. On the other hand, if the surface is composed of a material that is an insulator (a dielectric), the surface charge takes much longer to dissipate. Thermoplastic polymers are typically excellent insulators and thus are unsatisfactory for uses requiring a nature that will dissipate charges. As the polymers accumulate high charges promoting an attraction for dust and dirt, they can discharge to any lower potential body with which they come in contact. About 3000 to 25,000 volts or more can easily sit on the polymer surface. If this discharges to a circuit board wrapped with the polymeric plastic, such a high voltage will ruin the circuit board. To modify a polymer to have antistatic characteristics and dissipate charges, the conductivity might be increased which in turn causes an increase in the rate of static dissipation, thereby reducing clinging effect, eliminating harmful static discharge, and preventing accumulation of dust.

It is well known that static charge can be reduced by increasing the moisture content of the atmosphere, and thus the approach in the past has been to use an antistatic agent which will modify the inherently dielectric polymer to impart hydrophilic properties to it by providing migrating agents with functional groups that attract moisture to it. This migration is colloquially referred to in the art of antistatic polymer technology as a "blooming" or "bleeding" effect. Such films can overbloom and lose their antistatic character if subjected to a 24 hour water shower or a prolonged heat exposure (12 days in a 70° C. oven).

Of relevance is the English translation of Japanese Kokai (Published Application) No. 61-2703, inventors Inazawa et al, assignors to Showa Denko, published Jan. 8, 1986 (filed June 15, 1984, filing no. 59-121854). This states on page 1 that they claim an electroconductive resin, made of a copolymer of ethylene and unsaturated carboxylic acid, where a part or a whole of said carboxylic acid forms a salt with a nitrogen-containing compound chosen from a group comprising amine compounds and quaternary ammonium salts and the content of said nitrogen-containing compound is at least 1.3 mmol/g of the resin.

Many patents show quaternary amines (also referred to as quaternary ammonium compounds or salts) as antistatic agents. Examples are U.S. Pat. No. 3,324,091 to Sauides, U.S. Pat. Nos. 3,445,440, and 3,517,045 both to Susi and Arthen, U.S. Pat. No. 3,894,077 to Horikawa et al, U.S. Pat. No. 4,104,175 to Martinsson et al, U.S. Pat. Nos. 4,268,583 and T961009 both to Hendy, and U.S. Pat. No. 4,605,684 to Pcolinsky.

Also of interest is Japanese Published Patent Application Kokai No. 59-47243, Ito et al, assignors to Mitsui (published Mar. 16, 1984) which shows an electrically conductive resin composition comprising ethylene/alpha,beta unsaturated carboxylic acid copolymer and tertiary alkanolamine.

Antistatic skin packaging is disclosed in U.S. Pat. Nos. 4,707,414; 4,677,809; 4,623,564; 4,554,210; and 4,590,741 to Long and Maciocia, assignors to General Dynamics. All of these show tertiary animal fatty amines as the antistatic agent.

Also, U.S. Pat. Nos. 4,610,353; 4,685,563; 4,241,829; 4,480,747; 4,482,048; and 4,712,674, all show coating or painting such as by spraying, brushing or rolling, a conductive carbon coating onto cardboard.

More particularly, U.S. Pat. No. 3,933,779 issued Jan. 20, 1976 to Baron et al assignors to Fine Organics discloses an antistatic polymer blend comprising a synthetic polymer and an antistatically effective amount of a compound of the formula:

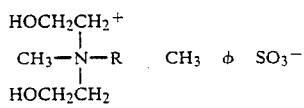

wherein R is alkyl of 4 to 18 carbon atoms unsubstituted or substituted by halo or aryl.

At pages 18 and 19 of published European Patent Application 0219315 Mott assignor to Dow, date of publication Apr. 22, 1987, (counterpart of U.S. Pat. No. 4,756,414, issued July 12, 1988) is a passage starting that their preferred antistatic material is an acrylate monomer-oligomer mixture containing an alkylether triethyl ammonium sulfate available from Metallized Products under the trade-name Staticure, which material is curable by exposure to an electron beam to a permanent, non-bleeding coating which is not dependent on humidity for its antistatic effect. The passage in EP 0219315 goes on to say that further details concerning this material appear in British Patent Application No. 2,156,362 published Oct. 9, 1985.

British Patent Application No. 2,156,362 is the counterpart of U.S. Pat. No. 4,623,594 issued Nov. 18, 1986 to Keough assignor to Metallized Products. U.S. Pat. No. 4,623,594 claims:

1. An antistatic laminate, both sides of which have antistatic characteristics, comprising:
   (A) a substrate sheet;
   (B) a continuous coating on one side of said substrate sheet, said continuous coating comprising the electron radiation cured product of:
      (1) an electron beam curable prepolymer; and
      (2) an effective amount of a saturated quaternary ammonium compound antistatic agent soluble in said prepolymer the product being a reaction product of the prepolymer and the ammonium compound converted into a substantially solid product.
2. The antistatic laminate of claim 1 wherein said quaternary ammonium compound is a trialkylalkyletherammonium salt [Emphasis supplied.]

The laboratory examples of U.S. Pat. No. 4,623,594 show that the particular trialkyl alkylether ammonium salt employed was Emerstat 6660 from Emery Industries. Page 52 of a catalog entitled "Miscellaneous Surfactants" describes Emerstat 6660 as a 100% active liquid cationic compound which offers high performance antistatic capacity, but page 52 does not give any generic chemical formula. It is believed that Emerstat 6660 is a diethoxylated alkyl ammonium salt of the formula $(A)(A')N[(CH_2CH_2O)_nH]_2^+ \ A'OSO_3^-$ which is further described below.

Of general interest is U.S. Pat. No. 4,678,836 (July 7, 1987) McKinney et al assignors to Dow Chemical. It shows blends of linear low density polyethylene (LLDPE) and ethylene-acrylic acid (EAA). Also of general interest is U.S. Pat. No. 3,799,901, Mar. 26, 1974, McCann et al, assignors to Dow Chemical. It shows the preparation of latexes by direct dispersion of acidic organic polymers into aqueous alkaline media.

OBJECT OF THE INVENTION

Figure 1:
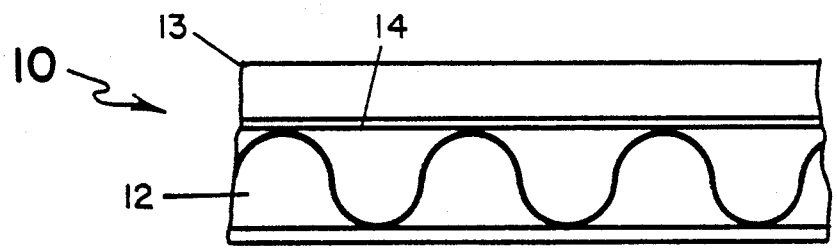
FIG. 1 is an enlarged partial side section showing the structure of the packaging laminate according to a preferred embodiment of the present invention.

A need exists for a semi-rigid laminate which is suitable for packaging static-sensitive items which combines permanent protection of the item from exposure to electrostatic charge, mechanical support of the item while it is being packaged and handled in packaged form, and adaptability to state-of-the-art packaging techniques.

Therefore, it is an object of the present invention to provide an antistatic material useful in coating a semi-rigid substrate such as cardboard to produce a laminate for use in heat-sealable, skin packaging processes for the packaging of static sensitive devices, and/or conversion to boxes.

It is also an object that the protection from electrostatic charge afforded by the laminate is substantially independent of ambient humidity, i.e. the laminate is still able to decay an applied ±5000 VDC in less than about 3000 ms, more preferably less than about 2000 ms, when conditioned at less than about 15% relative humidity. It is another object that the laminate is permanently antistatic, i.e. exhibit an SDT less than about 3000 ms, more preferably less than 2000 ms, even after a 24 hour water shower, and/or after a 12 day oven aging at about 70° C.

Another object of the invention is to provide an antistatic package which is constructed from such a laminate.

A further object of the invention is the provision of a method for making such a laminate.

These and other objects of the invention will become readily apparent from the ensuing description when it is taken together with the following drawings.

SUMMARY OF THE INVENTION

The present invention provides an improvement over existing antistatic packaging materials by utilizing a permanently antistatic heat-sealable coating layer applied to at least one surface of a semi-rigid substrate. The resulting packaging laminate can then be formed into an antistatic container for the packaging of static-sensitive items, or a sheet of the laminate may provide antistatic protection and mechanical support to an item which is to be skin-packaged with a heat-sealable plastic sheet. Also such a coated cardboard is useful to make a skin package for devices in a medical operating room where explosive oxygen and/or ether are present and thus protection from static electricity must be provided. Also such coated cardboard may be advantageously employed for any skin packaging use requiring a plastic with a decreased tendency to accumulate dust.

The present invention provides a semi-rigid, heat-sealable, laminate with permanent antistatic characteristics comprising a semi-rigid deformable substrate having a surface with a surface portion for supporting a static sensitive item to be packaged, and a heat-sealable, permanently antistatic layer extending over and bonded to said surface, said layer including a modified acid copolymer selected from:

(I) a mixture of (A) a polymer containing carboxylic acid moieties and (B) an antistatically effective amount of a quaternary amine; or from (II) an acid/base reaction product of (A) a polymer containing carboxylic acid moieties and (C) an antistatically effective amount of an organic or inorganic base amine wherein:

(A) the polymer containing carboxylic acid moieties is a copolymer of (i) an alpha-olefin of the formula $RCH=CH_2$ wherein R is H or $C_1$ to $C_{20}$ alkyl, $C_1$ to $C_{20}$ alkoxy, or $C_6$ aryl, and (ii) an alpha,beta-ethylenically unsaturated carboxylic acid, (B) the quaternary amine is of the formula $$[(R^1)(R^2)(R^3)(R^4)N]^+[X]^-$$

wherein $R^1$ is selected from H, aryl, $C_1$ to $C_{50}$ alkyl optionally having one or more non-contiguous $C=O$ or $NHC=O$ or $-S-$ or $-O-$ in the carbon chain, or the same as $R^2$;

each of $R^2$, $R^3$, and $R^4$, is the same or different and selected from H, $C_1$ to $C_{18}$ alkyl optionally substituted with one or more OH or from $-(R^5-O)_a-H$ where a is an integer from 1 to 10 and $R^5$ is ethylene or propylene; and X is an anion selected from chloride, bromide, iodide, fluoride, nitrate, fluoborate, phosphate, $C_1$ to $C_{20}$ alkyl phosphate, sulfate, $C_1$ to $C_{20}$ alkyl sulfate, formate, $C_1$ to $C_{20}$ alkyl or $C_6$ to $C_{24}$ alkaryl or aryl sulfonate, acetate, trifluoroacetate, citrate, propionate, or tartrate, and (C) the organic or inorganic base is of the formula $M^+ \ Y^-$, wherein $M^+$ is selected from $Li^+$, $Na^+$, $K^+$, $Rb^+$, $Cs^+$, or $R^6R^7R^8R^9N^+$, where $R^6$, $R^7$, $R^8$, and $R^9$ are independently selected from a $C_1$ to $C_4$ alkyl, benzyl, 2-hydroxyethyl, or hydroxypropyl, and $Y^-$ is selected from hydroxide, $C_1$ to $C_4$ alkoxide, bicarbonate, or carbonate.

Optionally, an additional polymeric resin, which is described in further detail below, may be blended with the modified acid copolymer.

Referring to the anion X, preferably, the $C_1$ to $C_{20}$ alkyl phosphate is methyl phosphate or ethyl phosphate, the $C_1$ to $C_{20}$ alkyl sulfate is methyl sulfate or ethyl sulfate, and the $C_1$ to $C_{20}$ alkyl or $C_6$ to $C_{24}$ alkaryl or aryl sulfonate is methanesulfonate, butanesulfonate, benzenesulfonate, or $C_1$ to $C_{18}$ alkyl benzenesulfonate.

The present invention also provides a method for making a semi-rigid, heat-sealable, laminate with permanent antistatic characteristics comprising 1) modifying an acid copolymer by mixing with heat, optionally with solvent, (A) a polymer containing carboxylic acid moieties and an antistatically effective amount of a modifier selected from either (B) a quaternary amine or (C) an organic or inorganic base wherein:

(A) the polymer containing carboxylic acid moieties is a copolymer of (i) an alpha-olefin of the formula $RCH=CH_2$ wherein R is H or $C_1$ to $C_{20}$ alkyl, $C_1$ to $C_{20}$ alkoxy, or $C_6$ aryl, and (ii) an alpha,beta-ethylenically unsaturated carboxylic acid, and (B) the quaternary amine is of the formula $$[(R^1)(R^2)(R^3)(R^4)N]^+[X]^-$$

wherein $R^1$ is selected from H, aryl, or $C_1$ to $C_{50}$ alkyl optionally having one or more non-contiguous $C=O$ or $NHC=O$ or $-S-$ or $-O-$ in the carbon chain, or the same as $R^2$;

each of $R^2$, $R^3$ and $R^4$ is the same or different and selected from H, $C_1$ to $C_{18}$ alkyl optionally substituted with one or more OH or from $-(R^5-O)_a-H$ where a is an integer from 1 to 10 and $R^5$ is ethylene or propylene; and X is an anion selected from chloride, bromide, iodide, fluoride, nitrate, fluoborate, phosphate, $C_1$ to $C_8$ alkyl phosphate, sulfate, $C_1$ to $C_8$ alkyl sulfate, formate, $C_1$ to $C_8$ alkyl or $C_6$ to $C_{24}$ alkaryl or aryl sulfonate, acetate, citrate, trifluoroacetate, propionate, or tartrate, (C) the organic or inorganic base is of the formula $M^+ \ Y^-$, wherein $M^+$ is selected from $Li^+$, $Na^+$, $K^+$, $Rb^+$, $Cs^+$, or $R^6R^7R^8R^9N^+$, where $R^6$, $R^7$, $R^8$, and $R^9$ are independently selected from a $C_1$ to $C_4$ alkyl, benzyl, 2-hydroxyethyl, or hydroxypropyl, and $Y^-$ is selected from hydroxide, $C_1$ to $C_4$ alkoxide, bicarbonate, or carbonate, and 2) applying a layer of said modified acid copolymer to a sheet of semi-rigid substrate.

Also, the present invention provides a package for enclosing static sensitive items, said package being constructed from a laminate comprising a semi-rigid substrate having an antistatic layer extending over and bonded to at least one surface of said substrate.

The present invention also provides a package for vacuum packaging a static sensitive item comprising:

(1) a semi-rigid substrate having a surface with a central supporting portion and a border portion surrounding said central supporting portion and a heat-sealable, antistatic layer extending over and bonded to substantially all of said surface, said layer including the above-described modified acid copolymer, and (2) a sheet of flexible, heat-sealable antistatic film covering said surface and bonded to said border portion to form a vacuum-sealed enclosure over said central supporting portion.

The present invention also provides a semi-rigid, heat-sealable laminate with permanently antistatic characteristics comprising a semi-rigid deformable substrate having a surface with a surface portion for supporting a static sensitive item to be packaged and a heat-sealable, antistatic layer extending over and bonded to said surface, said layer being resultant from mixing with heat, optionally with solvent, (A) a polymer containing carboxylic acid moieties and an antistatically effective amount of a modifier selected from either (B) a quaternary amine or (C) an organic or inorganic base wherein:

(A) the polymer containing carboxylic acid moieties is a copolymer of (i) an alpha-olefin of the formula $RCH=CH_2$ wherein R is H or $C_1$ to $C_{20}$ alkyl, $C_1$ to $C_{20}$ alkoxy, or $C_6$ aryl, and (ii) an alpha,beta-ethylenically unsaturated carboxylic acid, and (B) the quaternary amine is of the formula $$[(R^1)(R^2)(R^3)(R^4)N]^+[X]^-$$

wherein $R^1$ is selected from H, aryl, or $C_1$ to $C_{50}$ alkyl optionally having one or more non-contiguous C=O or NHC=O or —S— or —O— in the carbon chain, or the same as $R^2$;

each of $R^2$, $R^3$, and $R^4$ is the same or different and selected from H, $C_1$ to $C_{18}$ alkyl optionally substituted with one or more OH or from —($R^5$—O)$_a$—H where a is an integer from 1 to 10 and $R^5$ is ethylene or propylene;

X is an anion selected from chloride, bromide, iodide, fluoride, nitrate, fluoborate, phosphate, $C_1$ to $C_8$ alkyl phosphate, sulfate, $C_1$ to $C_8$ alkyl sulfate, formate, $C_1$ to $C_8$ alkyl or $C_6$ to $C_{24}$ alkaryl or aryl sulfonate, acetate, citrate, trifluoroacetate, propionate, or tartrate, and (C) the organic or inorganic base is of the formula M + Y −, wherein M + is selected from Li+, Na+, K+, Rb+, Cs+, or $R^6R^7R^8R^9N+$, where $R^6$, $R^7$, $R^8$, and $R^9$ are independently selected from a $C_1$ to $C_4$ alkyl, benzyl, 2-hydroxyethyl, or hydroxypropyl, and Y|− is selected from hydroxide, $C_1$ to $C_4$ alkoxide, bicarbonate, or carbonate.

The present invention also provides a semi-rigid, heat-sealable laminate with permanently antistatic characteristics comprising a planar, semi-rigid deformable substrate having a surface with a surface portion for supporting an item to be packaged, and a heat-sealable, permanently antistatic layer extending over and bonded to said surface, said layer obtained from mixing with heat, optionally with solvent, (A) ethylene-acrylic acid or ethylene-methacrylic acid and an antistatically effective amount of a modifier selected from either (B) or (C) where (B) is a quaternary amine of the formula $[R^1R^2R^3R^4N]^+[X]^-$ where $R^1$ is a $C_4$ to $C_{30}$ straight or branched alkyl optionally including one or more ether linkages, each of $R^2$ and $R^3$ and $R^4$ is the same or different and selected from methyl or ethyl, and X is chloride, methyl sulfate, ethyl sulfate, methane sulfonate, toluene sulfonate, and (C) is an organic or inorganic base of the formula M + Y − where M + is K+, Cs+, or $R^6R^7R^8R^9N$ + wherein $R^6$, $R^7$, $R^8$, and $R^9$ are selected from methyl, ethyl, or $C_2H_4OH$ and Y|− is hydroxide, methoxide, or ethoxide.

DETAILED DESCRIPTION OF THE DRAWINGS AND OF THE INVENTION

Known in the packaging art are various ways to package static-sensitive items for storage or shipment. One packaging technique involves the assembly of a six-sided container, such as a box, in which the item to be packaged is enclosed. Another, more modern method, called "skin-packaging", consists of drawing a vacuum between the item and a semi-molten plastic sheet of film. The heated, semi-molten sheet of film bonds to itself and around the item during cooling, thereby forming a seal which maintains the vacuum between itself and the enclosed item. Typically, when being skin-packaged, the item will be carried on a piece of stiff material which provides a backing board as support for the item during the packaging procedure. A packaging laminate which is useful with either packaging technique and which provides protection from static buildup for static-sensitive items such as electronic components is illustrated in FIG. 1.

As shown in FIG. 1, the laminate of the invention, indicated generally by 10, comprises a substrate sheet of packaging material 12. The substrate material preferably comprises a standard packaging material which possesses sufficient stiffness or rigidity to provide support to an item to be packaged, yet which is deformable so that it can be shaped into the form of a package. Such a material can comprise, for example, cardboard or fiber board, either of which is commonly used to construct six-sided enclosures such as boxes for packaging electronic items.

A second layer 13 is formed on, and is co-extensive with a surface 14 of the substrate 12. Layer 13 possesses antistatic characteristics to prevent the buildup and discharge of static electricity between an item which is to be packaged and the surface of the packaging material 12 which encloses the item. Layer 13 is composed of a modified copolymer which provides the resulting laminate with the level of antistatic characteristic which is necessary to prevent the buildup of static charges. Layer 13 also possesses the characteristic of being able to bond to a semi-molten plastic film which is used in a skin-packaging process, i.e. it is heat-sealable.

Figure 2:
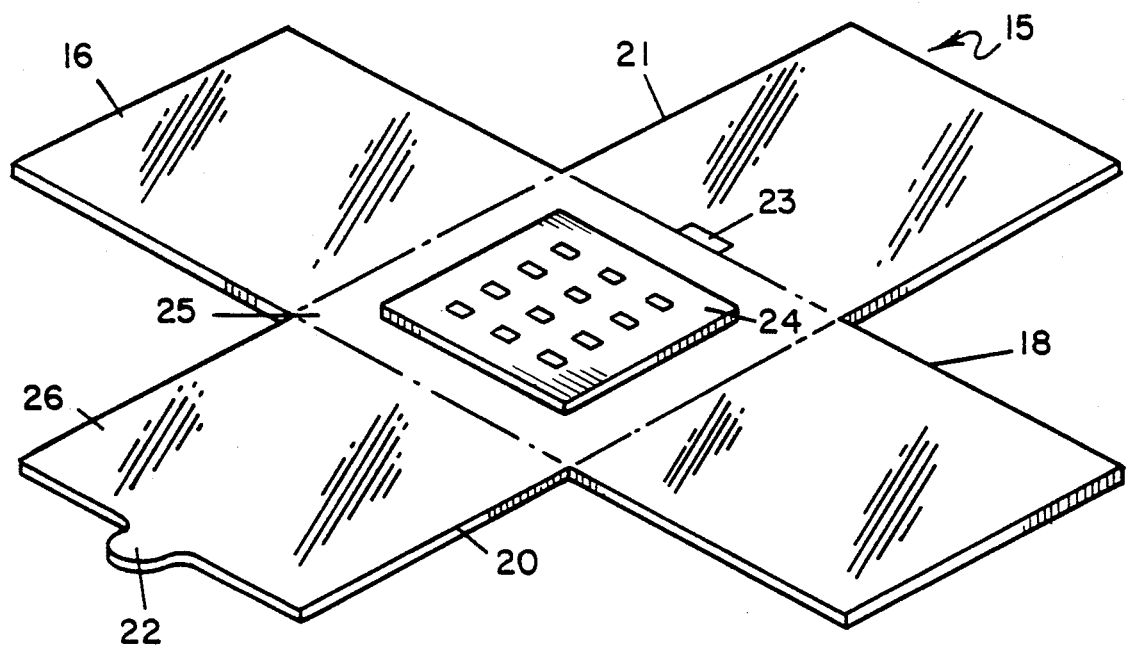
FIG. 2 is a perspective view of a sheet of packaging laminate according to a preferred embodiment of the present invention which has a shape suitable for forming an anti-static package.

One type of antistatic package which may be formed from a sheet of laminate having the structure illustrated in FIG. 1 and explained herein above can be understood with reference to FIGS. 2 and 3. FIG. 2 illustrates a sheet of antistatic laminate 15 which is fabricated according to the herein-described procedure and which has the shape of an X. The X includes a pair of opposing arms 16 and 18 and another pair of opposing arms 20 and 21. The arm 20 has a tab 22 along one edge and the arm 21 has a slot 23 which extends through the arm 21. An electronic circuit board 24 is placed on the area 25 which is formed by the intersection of the arms. The surface 26 of the sheet 15 upon which the circuit board 24 rests has been coated with an antistatic layer according to the procedure described herein.

Figure 3:
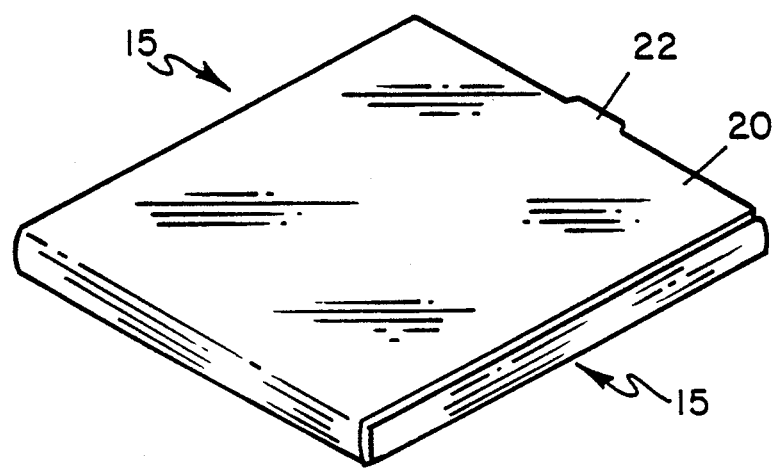
FIG. 3 is a perspective view of an anti-static package constructed from a sheet of packaging laminate according to the invention which has the form illustrated in FIG. 1.

The sheet 15 having the shape illustrated in FIG. 2 can be closed to hold the circuit board 24 in a six-sided container illustrated in FIG. 3. The coating of the surface 26 with the antistatic layer prevents the buildup of a static charges which may accumulate while the sheet 15 and the circuit board 24 are being handled during packaging.

As illustrated in FIG. 3, the sheet 15 can be formed into a six-sided container by folding the opposing arms 16 and 18 over the circuit board 24 and then folding first arm 21 and then arm 20 over the circuit board and over arms 16 and 18. To keep the package closed, the tab 22 is inserted through the slot 23.

Figure 4:
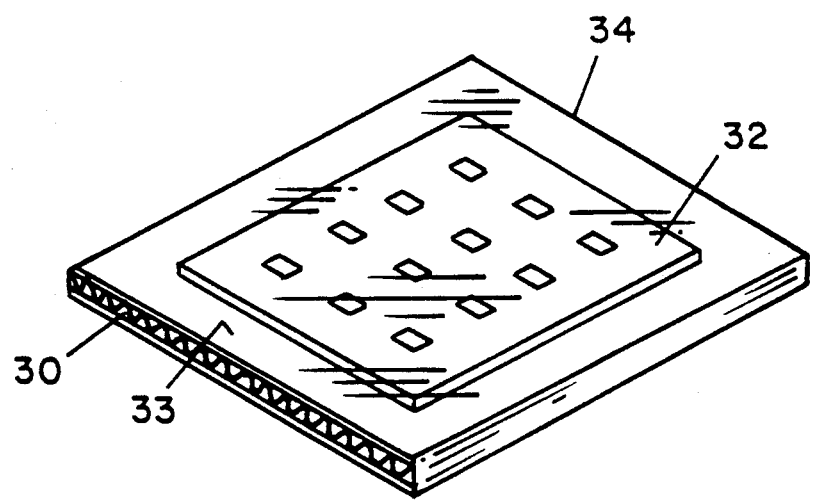
FIG. 4 is a perspective view of an anti-static package which is constructed from a support base of laminate according to a preferred embodiment of the present invention and an anti-static skin-packaging material which encloses it.

FIG. 4 illustrates the use of a laminate fabricated according to the method of the invention in a skin-packaging procedure. In the procedure, a sheet of laminate 30 which is fabricated according to the herein-described method supports a printed circuit board 32 on a layer 33 of antistatic material. Preferably, the sheet 30 is cut so that a continuous border of the layer 33 surrounds the circuit board 32. The sheet 30 with the circuit board 32 resting thereon is then sealed by any typical skin-packaging technique with a film of flexible plastic packaging material 34. During the packaging operation, the material 34 will bond to itself and to the layer 33 of antistatic material. This will enhance the quality of the completed package by increasing the total area of the completed bond. An apparatus which can form the skin-packaged container illustrated in FIG. 4 is available from Ampack Corporation under the model name "Poly-Tite, Port-A-Vac 300 Series".

During packaging, the package illustrated in FIG. 4 prevents the buildup of static charges between the laminate sheet 30 and the circuit board 32 by the provision of the antistatic layer 33. Use of an antistatic material for the flexible plastic sheet 34 will enhance the static prevention qualities of the FIG. 4 package. Sheet 34 may be formed from a flexible plastic film of acid copolymer and quaternary amine as described below. Also, circuit board 32 can be packaged between two sheets of material fabricated according to the herein-described method with the coated surface 33 of each sheet 30 contacting the circuit board 32.

The modified acid copolymer from which layer 13 may be formed is described in more detail below. One embodiment of this modified acid copolymer comprising a mixture with a quaternary amine is disclosed in commonly assigned copending U.S. Ser. No. 249,488, filed Sept. 26, 1988, which is a continuation-in-part of copending U.S. Ser. No. 143,885, filed Jan. 14, 1988. The disclosures of these two applications are incorporated herein by reference. Also for clarity, pertinent portions of these two applications are repeated below.

The acid copolymer is a polymer containing carboxylic acid moieties. By "polymers containing carboxylic acid moieties" as that term is used herein it is intended to mean copolymers of (i) an alpha-olefin having the formula $RCH=CH_2$ wherein R is H or $C_1$ to $C_{20}$ alkyl, $C_1$ to $C_{20}$ alkoxy, or $C_6$ aryl; and (ii) an alpha,beta-ethylenically unsaturated carboxylic acid. Preferably, when R is alkyl, it is $C_1$ to $C_8$ alkyl. Also, preferably, the alpha,beta-ethylenically unsaturated carboxylic acid is present in an amount by mol % of about 50% or less, more preferably about 30% or less, most preferably about 20% or less. Also, by the term "polymers containing carboxylic acid moieties", it is intended to mean that the copolymer of an alpha-olefin having the formula $RHC=CH_2$ wherein R is H or $C_1$ to $C_{20}$ alkyl, $C_1$ to $C_{20}$ alkoxy, or $C_6$ aryl, and an alpha,beta-ethylenically unsaturated carboxylic acid may be partially neutralized with a suitable cation such as zinc cation or sodium cation. Thus, the polymer containing carboxylic acid moieties may be an ionomer. Further, by the term "polymers containing carboxylic acid moieties" it is intended to include carboxylic acid-forming moieties such as anhydrides.

The acid copolymer need not necessarily comprise a two component polymer. Thus, although the olefin content of the acid copolymer preferably is at least 50 mol percent, more than one olefin may be employed. Also, other copolymerizable monoethylenically unsaturated monomers may be employed in combination with the olefin and the carboxylic acid comonomer. It is intended also to include terpolymers. Accordingly, acid copolymers or terpolymers suitable for use in the present invention include, but are not limited to, ethylene/acrylic acid copolymers, ethylene/methacrylic acid copolymers, ethylene/itaconic acid copolymers, ethylene/methyl hydrogen maleate copolymers, ethylene/maleic acid copolymers, styrene/maleic acid copolymers, styrene/maleic half ester copolymers, alkyl vinyl ether/maleic acid copolymers, alkyl vinyl ether/maleic half ester copolymers, ethylene/methyl hydrogen maleate/ethyl acrylate terpolymers, ethylene/methacrylic acid/vinyl acetate terpolymers, ethylene/acrylic acid/vinyl acetate terpolymers, ethylene/acrylic acid/vinyl alcohol terpolymers, ethylene/propylene/acrylic acid terpolymers, ethylene/styrene/acrylic acid terpolymers, ethylene/acrylic acid/methyl methacrylate terpolymers, ethylene/methacrylic acid/ethyl acrylate terpolymers, ethylene/itaconic acid/methyl methacrylate terpolymers, ethylene/methacrylic acid/acrylonitrile terpolymers, ethylene/fumaric acid/vinyl methyl ether terpolymers, ethylene/vinyl chloride/acrylic acid terpolymers, ethylene/vinylidene chloride/acrylic acid terpolymers, ethylene/vinyl flouride/methacrylic acid terpolymers, and ethylene/chlorotrifluroethylene/methacrylic acid terpolymers.

The copolymer of an alpha-olefin having the formula $RCH=CH_2$ wherein R is H or $C_1$ to $C_{20}$ alkyl, $C_1$ to $C_{20}$ alkoxy, or $C_6$ aryl, and an alpha,beta-ethylenically unsaturated carboxylic acid representatively may be produced by the free radical copolymerization of ethylene and a carboxylic acid comonomer therefor such as acrylic acid or methacrylic acid. Preferably, when R is alkyl, it is $C_1$ to $C_8$. Suitable such acid copolymers are the Primacor (TM) polymers, supplied by Dow Chemical Company, Midland, Mich. Primacor is produced by the copolymerization of ethylene and acrylic acid. Ethylene-acrylic acid copolymers are herein referred to as EAA copolymer. A very suitable Primacor polymer is Primacor 1410 or Primacor 5981. Other suitable such acid copolymers are sold under the trade-name Nucrel by du Pont; they are produced by the copolymerization of ethylene and methacrylic acid. Ethylene-methacrylic acid copolymers are herein referred to as EMAA copolymers. Ionomers are commercially available as Surlyn (R) from the E. I. du Pont de Nemours Company of Wilmington, Del., and are described in detail in U.S. Pat. Nos. 3,355,319 and 3,845,163.

The amine is a quaternary amine of the formula $[(R^1)(R^2)(R^3)(R^4)N]^+[X]^-$ wherein $R^1$ is selected from H, aryl, or $C_1$ to $C_{50}$ alkyl optionally having one or more non-contiguous $C=O$ or $NHC=O$ or $-S-$ or $-O-$ the carbon chain, or the same as $R^2$; each of $R^2$, $R^3$, and $R^4$ is the same or different and selected from H, $C_1$ to $C_{18}$ alkyl optionally substituted with one or more OH or from $-(R^5-O)_a-H$ where a is an integer from 1 to 10 and $R^5$ is ethylene or propylene; and X is an anion selected from chloride, bromide, iodide, fluoride, nitrate, fluoborate, phosphate, $C_1$ to $C_{20}$ alkyl phosphate, sulfate, $C_1$ to $C_{20}$ alkyl sulfate, formate, $C_1$ to $C_{20}$ alkyl or $C_6$ to $C_{24}$ alkaryl or aryl sulfonate, acetate, citrate, propionate, or tartrate. Preferably, the $C_1$ to $C_{20}$ alkyl phosphate is methyl phosphate or ethyl phosphate, the $C_1$ to $C_{20}$ alkyl sulfate is methyl sulfate or ethyl sulfate, and the $C_1$ to $C_{20}$ alkyl or $C_6$ to $C_{24}$ alkaryl or aryl sulfonate is methanesulfonate, butanesulfonate, benzenesulfonate, or $C_1$ to $C_{18}$ alkyl benzenesulfonate.

By "quaternary amine" as that term is employed herein, it is intended to include quaternary ammonium compounds and/or quaternary ammonium salts.

Suitable quaternary amines (QA) may be chosen from, but are not limited to, the methyl chloride salts of ethoxylated fatty amines. Commercial ones are available from the Tomah Division (Milton, Wis.) of Exxon Chemical and are represented by the formula:

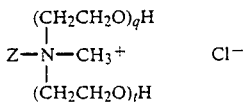

where Z is an alkyl or alkoxy radical, and q+t is the total number of moles of ethylene oxide in the chains. Examples of commercially available ones are as follows:

| COMMERCIAL QUATERNARY AMINES | | |
|---|---|---|
| QA Product Identification Number | Z | q + t |
| Q-14-2 | $C_{10}OC_3$ | 2 |
| Q-14-5 | $C_{10}OC_3$ | 5 |
| Q-14-15 | $C_{10}OC_3$ | 15 |
| Q-17-2 | $C_{13}OC_3$ | 2 |
| Q-S-2 | Soya | 2 |
| Q-S-5 | Soya | 5 |
| Q-S-15 | Soya | 15 |
| Q-18-2 | $C_{18}$ | 2 |
| Q-18-5 | $C_{18}$ | 5 |
| Q-18-8 | $C_{18}$ | 8 |
| Q-18-10 | $C_{18}$ | 10 |
| Q-18-15 | $C_{18}$ | 15 |
| Q-T-2 | Tallow | 2 |
| Q-T-5 | Tallow | 5 |
| Q-T-15 | Tallow | 15 |
| Q-DT-3 | "Tallow Diamine" | 3 |

Other very suitable quaternary amines are the ethyl sulfate salts or methyl sulfate salts of alkoxylated fatty amines. Commercial ones are available under the tradename Emerstat 6660 from Emery Industries and it is believed from applicants' own chemical analysis that they are represented by the formula: $(A)(A')N[(CH_2CH_2O)_nH]_2+ A'OSO_3-$ where A is $C_8$ to $C_{20}$ alkyl, A' is ethyl and n is an integer from 1 to 4. Also suitable are methyl sulfate salts such as that sold under the tradename Cyastat by Cyanamid; it has the formula $C_{11}H_{23}CONHC_3H_6N(CH_3)_3+CH_3OSO_3-$. Also suitable are ethosulfate salts such as that sold under the trade-name Larostat 264A Anhydrous, which is a modified soyadimethyl ethylammonium ethosulfate.

Additional QA's may be prepared by reacting a tertiary amine (TA) and an acid or alkylating agent, as further described in the Examples below.

A second embodiment of the modified acid copolymer comprises the acid/base reaction product of the acid copolymer and an antistatically effective amount of an organic or inorganic base. This is disclosed in copending U.S. Ser. No. 164,756, filed Mar. 7, 1988, to Roberts and Morgan, the disclosure of which is incorporated herein by reference. The organic or inorganic base is of the formula $M|+ Y|-$, wherein $M|+$ is selected from $Li+$, $Na+$, $K+$, $Rb+$, $Cs+$, or $R^6R^7R^8R^9N+$, where $R^6$, $R^7$, $R^8$, and $R^9$ are independently selected from a $C_1$ to $C_4$ alkyl, benzyl, 2-hydroxyethyl, or hydroxypropyl, and $Y|-$ is selected from hydroxide, $C_1$ to $C_4$ alkoxide, bicarbonate, or carbonate.

The polymer containing carboxylic acid moieties and the modifier selected from either the quaternary amine or from the organic or inorganic base are combined by mixing with heat, optionally with solvent. Optionally, a polymer compatible therewith, such as a polyolefin, may be blended in the mixture. Any suitable mixing means may be employed such as a kettle, a blender or a twin screw extruder. The heat should be from about 50° C. to 290° C., more preferably about 100° C. to 250° C., even more preferably about 100° C. to 200° C. Then the resultant may be formed into a film by any of the various methods further discussed below, and then laminated onto the cardboard to form a coating thereon. Lamination may be by heat and/or adhesive. Alternatively, the resultant may be extrusion coated onto the cardboard, or if solvent is present, sprayed or painted directly onto the cardboard to form a coating thereon.

The coating film is permanently antistatic. It will dissipate an applied charge of ±5000 Vdc in less than about 3000 ms, more preferably less than 2000 ms, using the method described in Federal Test Method Standard 101c, Method 4046.1, even after a 24 hour water shower, and/or after a 12 day oven aging at about 70° C.

In general, it may be desirable to decrease the triboelectric charging propensity of the antistatic laminate. It has been discovered that this may be accomplished through the use of various low molecular weight additives, herein designated "triboelectric enhancers" or "enhancers". Examples XVI and XVII describe these enhancers further. Particularly useful in this regard is an ethoxylated sorbitan ester, e.g. polyoxyethylene (20) sorbitan monolaurate.

Based on the % weight amount of polymer containing carboxylic acid moieties, it is preferred that the modifier selected from either the quaternary amine or from the organic base or inorganic base be present in a weight % amount up to about 50%, more preferably up to about 30%, even more preferably up to about 20%. Based on the total composition weight, which optionally may contain polyolefin, preferably the quaternary amine is present in a weight % amount of about 0.001% to about 30%, more preferably about 0.01% to about 20%, and even more preferably about 2% to about 10%. In the case of the organic or inorganic base, the mol % of base relative to carboxylic acid moieties in the polymer is 20% to 100%, preferably 50% to 100%. In no case should the mol % of organic or inorganic base exceed 100%. If a triboelectric enhancer is used, the preferred use level, based on the total composition weight, is about 0.001% to about 30%, more preferably about 0.01% to about 20%, and even more preferably about 2% to about 10%.

Many polymer resins are suitable polymers for blending with the modified acid copolymer. Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible structures of the material. These structures include, but are not limited to, isotactic, syndiotactic and random symmetries. Particularly suitable for blending are the polyolefins. The term "polyolefin" as used herein generally includes, but is not limited to, materials such as polyethylene (PE), polypropylene (PP), ethylene-vinyl acetate (EVA), linear low density polyethylene (LLDPE), high density polyethylene (HDPE), medium density polyethylene (MDPE), low density polyethylene (LDPE), very low density linear polyethylene (VLDPE), ethylene/alkyl-acrylate copolymer (EAlAcr) and the like, the homopolymers, copolymers, terpolymers etc. thereof, and blends and modifications thereof. The term "polyolefin" shall include all possible structures thereof, which includes, but is not limited to, isotactic, syndiotactic and random symmetries.

Blends of all families of polyolefins, such as blends of EVA, EAlAcr, PP, LDPE, HDPE, VLDPE, and LLDPE, may also be advantageously employed.

Measuring the antistatic property: The antistatic property is exhibited by the ability of the polymer containing the agent to promote static charge decay, i.e. to dissipate a static charge. The polymer alone will not dissipate a static charge, but the polymer containing the agent is able to dissipate 99% of an applied static charge of ±5000 volts direct current (Vdc) in a short amount of time, i.e. less than 3 seconds, (3000 milliseconds) more preferably less than 2 seconds (2000 milliseconds). Federal Test Method Standard 101c, Method 4046.1, "Electrostatic Properties of Materials" states less than 2000 ms and thus it is preferred to have a material that complies with 101c. Decay meters for measuring the time for dissipation of the applied volts are commercially available, such as the 406C static decay meter supplied by Electrotech Systems, Inc. Unless otherwise indicated in the Examples below, the films, prior to testing, were equilibrated at less than about 15% relative humidity (RH) at about room temperature (RT) for about 24 hours.

Some antistatic materials were tested for triboelectric charge generation. The procedure is described in an article entitled "Triboelectricity and Surface Resistivity do not Correlate", EOS/ESD Symposium, Anaheim, Calif., September, 1988, by S. L. Fowler. To summarize, two aluminum plates were used for this test. Plate 1 was a ground plane and was about 12 inches (30.5 cm)×12 inches (30.5 cm)×3/16 inch (0.5 cm) in size. Plate 2 was about 4 inches (10.2 cm)×3 inches (7.6 cm)×3/16 inch (0.5 cm) in size and had a non-contacting static voltmeter attached to it. Plate 2 also had an insulating rod or handle attached to it to allow the person performing the test to separate the plates without touching them and affecting the charge accumulation. The test was performed at 50% RH. The sample under test was placed on Plate 1. Plate 2 was pushed against the sample to make intimate contact with it. Plate 2 was then separated rapidly up against a stop, while the sample remained in contact with Plate 1. This stop limited the travel to approximately 1 inch (2.54 cm) of separation between the two plates. This procedure was repeated 4 times and the voltmeter readings averaged. Sometimes various materials were attached to the pair of aluminum plates, as designated in the Examples below. For instance, employed were aluminum plates having attached thereto EVA, solder-masked circuit board, ceramic integrated circuit, and copper. The idea was to test for triboelectric propensity against material that will appear in real life packaging situations. The principle of this measurement is that when two materials are placed in contact and then separated they give up or take on electrons thus leaving both materials with a net charge. Since one of the materials in the test is a metal plate, the charge on it can be measured by a static voltmeter. The magnitude and polarity of the charge is then an indicator of the tribo-charging propensity of the material under test. The voltage decreases with the use of enhancers as described in Examples XVI and XVII below, which is desirable.

Some of the antistatic materials were tested for surface resistivity and volume resistivity according to ASTM D257. There is not necessarily a correlation between the surface or volume resistivity of a film and the ability of a film to decay or dissipate charges. Thus, the term "antistatic" as used herein describes a material which can dissipate 99% of an applied static charge of ±5000 Vdc in a short amount of time, preferably a static decay time less than about 3 seconds, more preferably less than about 2 seconds (Federal Test Method Standard 101c, Method 4046.1, "Electrostatic Properties of Materials"). If the material also happens to have an antistatic resistivity, i.e. a surface resistivity of about $10^5$ to $10^{12}$ ohms/square as further described below, then that material will be described using the term "antistatic surface resistivity."

The Department of Defense and the Electronics Industry Association have standards on surface resistivity of a material in ohms/square as follows:

| Surface Resistivity Ranges (ohms/square) | | |
|---|---|---|
| Insulative | Antistatic or Static Dissipative | Conductive |
| greater than $10^{12}$ | $10^{12}$ to $10^5$ | less than $10^5$ |

There is no correlation between triboelectric propensity and either surface resistivity or static decay time.

It is noted that some of the 5-layer films of the invention, as illustrated by Examples XIII and XIV below, have both a preferred static decay time of about 3000 milliseconds or less and a static dissipative (as opposed to insulative) surface resistivity of $10^{12}$ to $10^5$ ohms/square, even after a 24-hour water shower or after 12 days in a hot oven. Thus these 5-layer films are permanently antistatic by the definition of static decay time under about 3000 ms. Also they exhibit a permanently antistatic surface resistivity. Neither the 24-hour water shower nor the 12-day hot oven takes out the "antistatic" SDT characteristic or the "antistatic" surface resistivity characteristic.

Some of the antistatic materials were tested for crazing, i.e. polycarbonate compatibility, which was a test developed by General Electric Company, published as their "LEXAN (R) Resin Technifacts" T-47 test method. This test consists of bending or flexing test coupons or bars of LEXAN (R) about ⅛ inch (0.32 cm) thick on metal jigs to several known stress levels of about 500 to 3400 psi (35 to 239 kg/cm²) and the material being evaluated is then applied to the stressed coupons and the combination maintained at several temperatures for 5 days. The temperatures are about 73° F. (22.8° C.), 120° F. (48.9° C.), 158° F. (70° C.), and 185° F. (85° C.). A comparison of the strain independent of the material being evaluated, the radius of the curvature of the upper surface of the jig, and the stress level of the LEXAN (R) bars is as follows:

| STRESS LEVEL ⅛" THICK BARS UNFILLED LEXAN RESIN | | RADIUS OF UPPER SURFACE OF JIG | | STRAIN INDEPENDENT OF MATERIAL |
|---|---|---|---|---|
| PSI | kg/cm² | Inches | cm | Percent |
| 500 | 35 | 42.437 | 107.8 | 0.15 |
| 750 | 53 | 28.270 | 71.8 | 0.22 |
| 1000 | 70 | 21.187 | 53.8 | 0.29 |
| 1250 | 88 | 17.063 | 43.3 | 0.37 |
| 1500 | 105 | 14.103 | 35.8 | 0.44 |

| STRESS LEVEL ⅛" THICK BARS UNFILLED LEXAN RESIN | | RADIUS OF UPPER SURFACE OF JIG | | STRAIN INDEPENDENT OF MATERIAL |
|---|---|---|---|---|
| PSI | kg/cm² | Inches | cm | Percent |
| 1750 | 123 | 12.080 | 30.7 | 0.51 |
| 2000 | 141 | 10.563 | 26.8 | 0.59 |
| 2250 | 158 | 9.381 | 23.8 | 0.66 |
| 2500 | 176 | 8.437 | 21.4 | 0.74 |
| 2750 | 193 | 7.664 | 19.5 | 0.81 |
| 3000 | 211 | 7.020 | 17.8 | 0.88 |
| 3400 | 239 | 6.187 | 15.7 | 1 |

At the end of the exposure, the bars are visually checked for crazing. Results are reported as the maximum stress to which the bar can be subjected while in contact with the particular environment without the occurrence of crazing. It is desired that the film exhibit no crazing or only very slight crazing at a temperature 158° F. (70° C.) and stress of 1700 psi, more preferably a temperature of 185° F. (85° C.) and stress of 1700 psi.

The manufacture of film is known to those in the art. For example, see U.S. Pat. Nos. 4,274,900; 4,229,241; 4,194,039; 4,188,443; 4,048,428; 3,555,604; 3,741,253; 3,821,182 and 3,022,543. The disclosures of these patents are generally representative of such processes and are hereby incorporated by reference.

Other process variations for forming films are known to those in the art. For example, conventional pressing, thermoforming or laminating techniques (including corona laminating) may be employed. For instance, multiple layers may be first coextruded with more layers then being laminated thereon, or two multi-layer tubes may be coextruded with one of the tubes thereafter being laminated onto the other.

Advantageously, an outside polymeric layer of a film may include a small amount of about 10% by weight or less, more desirably about 7% by weight or less of an antiblock, to adjust the degree of tackiness. A suitable antiblock is EPE 8160 supplied by Teknor Apex.

The following Examples are intended to illustrate the preferred embodiments of the invention and comparisons thereto. It is not intended to limit the invention thereby.

Unless indicated otherwise in the Examples, the testing for static decay time (SDT) was done after Equilibration for 24 hours, at about room temperature (RT), at less than about 15% relative humidity (RH). Also it is noted that sometimes SDT testing was done to samples that had been subjected to abuse such as 1 to 12 days in a hot, about 160° F. (71° C.), oven or a 24-hour water shower. Where the oven is designated as "humid", a beaker of water had been kept in the oven with the film sample during testing to maintain a "humid" atmosphere; otherwise the oven was simply a "dry" or "ambient" oven, without any water beaker.

| MATERIALS EMPLOYED IN THE EXAMPLES | | |
|---|---|---|
| ANTIBLOCK | INGREDIENTS | SUPPLIER |
| EPE 8160 | Polyethylene Containing Micron Sized Silica | Teknor Apex |

| VLDPE | MI | DENSITY | COMONOMER | SUPPLIER |
|---|---|---|---|---|
| XU61512.08L | 0.80 | 0.910 | Octene | Dow Chemical |

| LLDPE | MI | DENSITY | COMONOMER | SUPPLIER |
|---|---|---|---|---|
| DOWLEX 2045.03 | 1.1 | 0.920 | Octene | Dow Chemical |
| Dowlex 4002 | 3.3 | 0.912 | Octene | Dow Chemical |

| EVA | MI | % VA | COMONOMER | SUPPLIER |
|---|---|---|---|---|
| LD318.92 | 2.0 | 9 | Vinyl Acetate | Exxon |
| Alathon 3165 | 0.7 | 18 | Vinyl Acetate | du Pont |

| EAA | MI | % BY WEIGHT ACRYLIC ACID | % BY WEIGHT ETHYLENE | SUPPLIER |
|---|---|---|---|---|
| PRIMACOR 1410 | 1.5 | 9 | 91 | Dow Chemical |
| PRIMACOR 5981 | 300 | 20 | 80 | Dow Chemical |
| PRIMACOR 5980 | 300 | 20 | 80 | Dow Chemical |

| ZINC METHACRYLATE IONOMER OF EMAA | FORMULA | SUPPLIER |
|---|---|---|
| Surlyn 1650 | Partially zinc neutralized ethylene methacrylic acid copolymer | du Pont |

| EMAA | MI | % BY WEIGHT METHACRYLIC ACID | % BY WEIGHT ETHYLENE | SUPPLIER |
|---|---|---|---|---|
| Nucrel 1207 | 7 | 12 | 88 | du Pont |
| Nucrel 1202 | 2 | 12 | 88 | du Pont |

| QA | FORMULA | SUPPLIER |
|---|---|---|
| Q-14-2 | $[C_{10}H_{21}OC_3H_6N(C_2H_4OH)_2CH_3]^+Cl^-$ | Tomah Div. of Exxon |
| Emerstat 6660 | $[H(CH_2)_{8-20}](C_2H_5)N[(C_2H_4O)_{1-4}H]_2+ C_2H_5OSO_3^-$ | Emery Industries |
| Cyastat | $C_{11}H_{23}CONHC_3H_6N(CH_3)_3{}^+CH_3OSO_3{}^-$ | Cyanamid |
| Larostat 264A Anhydrous | Modified soyadimethyl ethylammonium ethosulfate | Jordan/ PPG/ Mazer |
| TMAH | Tetramethylammonium hydroxide | Southwestern Analytical Chemicals Div. of Mooney |

| TA | FORMULA | SUPPLIER |
|---|---|---|
| Empigen AB | Lauryl dimethylamine | Albright & Wilson |
| Empigen AY | $H(CH_2)_{10-18}(OC_2H_4)_{1-5}N(CH_3)_2$ | Albright & Wilson |
| E-14-2 | $C_{10}H_{21}OC_3H_6N(C_2H_4OH)_2$ | Tomah Div., Exxon |
| DMCA | N,N-dimethylcocoamine | Akzo Chemie |

| ACID OR ALKYLATING AGENT | FORMULA | SUPPLIER |
|---|---|---|
| MSA | Methanesulfonic Acid | Aldrich |
| DBSA | $H(CH_2)_{12-18}C_6H_4SO_3H$ | Alfa/Morton Thiokol |
| DES | Diethyl Sulfate | Aldrich |

*MI is melt index.

| SMA | Formula | M.W. | Acid Number | Supplier |
|---|---|---|---|---|
| 1000 | 1:1 styrene/maleic anhydride | 1600 | 480 | Sartomer |
| 1440 | Half-ester of maleic anhydride | 2500 | 175 | Sartomer |
| 17352 | Half-ester of maleic anhydride | 1700 | 270 | Sartomer |
| 2000 | 2:1 styrene/maleic anhydride | 1700 | 350 | Sartomer |

| -continued | | |
|---|---|---|
| MATERIALS EMPLOYED IN THE EXAMPLES | | |
| 2625 | Half-ester of maleic anhydride | 1900  220  Sartomer |
| Triboelectric Enhancers: | | Suppliers |
| Amphoteric L: coco amphoteric | | Tomah-Exxon |
| AO-14-2: Bishydroxyethylisodecyloxypropyl amine oxide | | Tomah-Exxon |
| AO-728: alkyloxypropyl amine oxide | | Tomah-Exxon |
| Miranol CM-SF: coco amphopropionate | | Miranol, Inc. |
| Miranol OS-D: oleoamphopropyl sulfonate | | Miranol, Inc. |
| Pluronic L62: ethylene oxide propylene oxide copolymer | | BASF |
| Stepanol DEA: Diethanolamine lauryl sulfate | | Stepan |
| Zonyl FSN: flurosurfactant | | du Pont |
| Steol CA-460: ammonium laureth sulfate | | Stepan |
| Stepanol WAT: tetraethylammonium lauryl sulfate | | Stepan |
| Hexcel 106G: -Bis(2-hydroxyethyl)octyl methyl ammonium p-toluene sulfate | | |
| Calfax 10L45: sodium mono- and di-decyl disulfonated diphenyl oxide | | Pilot Chemical Company |
| Tween 20: Polyoxyethylene (20) sorbitan monolaurate | | ICI Americas |
| Glycerol: HOCH$_2$CH(OH)CH$_2$OH | | Aldrich |
| Ethylene glycol: HOCH$_2$CH$_2$OH | | Aldrich |
| Propylene glycol: 1,2-propanediol | | Baker |
| Tetraethylene glycol: O(CH$_2$CH$_2$OCH$_2$CH$_2$OH)$_2$ | | Aldrich |
| Bacote 20: Zirconium ammonium carbonate | | Magnesium Electron, Inc. |
| Dow "Stature": XUS 15210.00L experimental additive | | Dow |

EXAMPLE I

LLDPE and EAA (Primacor 5981) were premixed in parts by weight and then blended therein with heating was a QA in parts by weight. The resultant mix of LLDPE+EAA+QA was then further blended in an amount of 33⅓% by wt. with EAA (Primacor 1410) in an amount of 66⅔% by wt. and that was hot blown into an extruded, tubular film. Films were about 1.5 to 2 mils (0.04 to 0.05 mm) thick. What was made is listed in Table IA.

TABLE IA

| | |
|---|---|
| 60 parts by wt LLDPE [Dowlex2045.03]<br>15 parts by wt QA [Q-14-2]<br>30 parts by wt EAA [Primacor 5981] | } 33⅓% by wt mix of LLDPE + EAA + QA |
| | 66⅔% by wt EAA [Primacor1410] |
| | 100% Resultant Film |

Then, the following electrical measurements were taken on samples of film as reported in Table IB.

TABLE IB

| SAMPLE | | |
|---|---|---|
| A | Static Decay Time as is | 180 ms |
| B | Static Decay Time after 24 hours water shower | 992 ms |
| C | Static Decay Time after days in hot oven at 71° C. | |
| | 3 days | 783 ms |
| | 5 days | 1149 ms |
| | 9 days | 7340 ms |
| | 12 days | 14683 ms |
| D | Surface resistivity as is | 2 × 10$^{10}$ ohms/square |
| E | Volume resistivity as is | 8.7 × 10$^{10}$ ohm-cm |
| | after 24 hr. water shower | 1.5 × 10$^{12}$ ohm-cm |
| | after 12 day dry oven | 1.8 × 10$^{14}$ ohm-cm |

The results show the film performed well as an antistatic film both in terms of static decay time and resistivity, and was resistant to abusive aging, except that it did not survive 12 days in a hot oven with a desirable SDT of about 3000 ms or less.

EXAMPLE I(i)

Coated samples of cardboard are prepared by laminating the film of Example I thereto. These samples should exhibit excellent adhesion to a film of zinc methacrylate ionomer of EMAA when tested on an Ampack skin packaging machine.

EXAMPLE II

Films were made as in Example I except that this time the QA was Emerstat 6660 supplied by Emery Industries. The resultant film that was made is as listed in Table IIA below.

TABLE IIA

| | |
|---|---|
| 60 parts by wt LLDPE [Dowlex 2045.03]<br>15 parts by wt QA [Emerstat 6660]<br>30 parts by wt EAA [Primacor 5981] | } 33⅓% by wt Mix of LLDPE + EAA + QA |
| | 66⅔% by wt EAA [Primacor 1410] |
| | 100% Resultant Film |

Then, the following electrical measurements were taken on samples of film as reported in Table IIB.

TABLE IIB

| SAMPLE | | |
|---|---|---|
| A | Static Decay Time as is | 209 ms |
| B | Static Decay Time after 24 hours | 539 ms |

TABLE IIB-continued

| SAMPLE | | |
|---|---|---|
| | water shower | |
| C | Static Decay Time after days in hot oven at 71° C. | |
| | 3 days | 78 ms |
| | 5 days | 97 ms |
| | 9 days | 361 ms |
| | 12 days | 195 ms |
| D | Surface resistivity as is | $1.2 \times 10^{11}$ ohms/square |
| E | Volume resistivity as is | $2.8 \times 10^{11}$ ohm-cm |
| | after 24 hr. water shower | $2.2 \times 10^{12}$ ohm-cm |
| | after 12 day hot dry oven | $1.3 \times 10^{12}$ ohm-cm |

The results show the film performed well as an antistatic film both in terms of decay time and resistivity, and was resistant to abusive aging.

EXAMPLE II(i)

Coated samples of cardboard are prepared by laminating the film of Example II thereto. These samples should exhibit excellent adhesion to a film of zinc methacrylate ionomer of EMAA when tested on an Ampack skin packaging machine.

EXAMPLE III

By blending with heat using a Berstorff twin screw extruder, a premix of pellets was made. First, 60 parts by weight EVA [LD318.92] and 30 parts by weight EAA [Primacor 5981] were mixed, and then added thereto was 15 parts by wt. QA [Emerstat 6660]. The resultant EVA+EAA+QA was then further blended with more polymer, and hot blown, 5-layer, extruded, tubular film having a thickness of about 4 mil (0.102 mm) was made. The ingredients of each layer were as recited in Table IIIA and are in % by weight.

TABLE IIIA

| OUTSIDE LAYER 1 | INTERIOR LAYER 2 | CORE LAYER 3 | INTERIOR LAYER 4 | OUTSIDE LAYER 5 |
|---|---|---|---|---|
| 95% EVA 5% Antiblock | 66⅔% EVA 33⅓% Mix of EVA + EAA + QA | 90% LLDPE 10% Mix of EVA + EAA + QA | 66⅔% EVA 33⅓% Mix of EVA + EAA + QA | 95% EVA 5% Antiblock |

Then, the following electrical measurements were taken on samples of film as reported in Table IIIB. Testing for triboelectric charging was against aluminum plates.

TABLE IIIB

| Abuse Treatment Noted or Film Tested As is | Ohms/square Surface Resistivity | Ohms-cm Volume Resistivity | Static Decay Time (ms) 1 Hr. Equilibration for the Film as is or after abuse treatment | Static Decay Time (ms) 24 Hr. Equilibration for the Film as is or after abuse treatment | Tribo Volts |
|---|---|---|---|---|---|
| As is | $1.8 \times 10^{13}$ | $7.0 \times 10^{13}$ | 111 | 222 | −1.2 |
| 1 Hr. Shower | $1.4 \times 10^{14}$ | $2.1 \times 10^{14}$ | 7 | 177 | 181.9 |
| 3 Hr. Shower | $5.7 \times 10^{14}$ | $1.6 \times 10^{14}$ | Less Than MMSDT* | 115 | 161.5 |
| 24 Hr. Shower | $6.4 \times 10^{12}$ | $4.4 \times 10^{14}$ | Less Than MMSDT | 102 | 76.4 |
| 24 Hr. Hot Humid Oven | $1.6 \times 10^{13}$ | $2.5 \times 10^{14}$ | 183 | 328 | 48.6 |
| Hot Dry Oven | | | | | |
| Day 1 | NT** | NT | 332 | 185 | NT |
| Day 2 | NT | NT | 272 | 178 | NT |
| Day 3 | NT | NT | 180 | 164 | NT |
| Day 4 | NT | NT | 287 | Won't Accept Full Charge | NT |
| Day 5 | NT | NT | 148 | 115 | NT |
| Day 6 | NT | NT | 164 | 348 | NT |
| Day 7 | NT | NT | 359 | 200 | NT |
| Day 8 | NT | NT | NT | 455 | NT |
| Day 9 | NT | NT | 400 | 97 | NT |
| Day 10 | NT | NT | 213 | 259 | NT |
| Day 11 | NT | NT | 247 | 93 | NT |

TABLE IIIB-continued

| Abuse Treatment Noted or Film Tested As is | Ohms/square Surface Resistivity | Ohms-cm Volume Resistivity | Static Decay Time (ms) | | Tribo Volts |
|---|---|---|---|---|---|
| | | | 1 Hr. Equilibration for the Film as is or after abuse treatment | 24 Hr. Equilibration for the Film as is or after abuse treatment | |
| Day 12 | $4.2 \times 10^{13}$ | $1.0 \times 10^{16}$ | 299 | 164 | 19.3 |

*MMSDT = minimum measurable static decay time
**NT = not tested

It is noted from Table IIIB that while the resistivity measurements bordered between antistatic and insulative (i.e. $10^{13}$ to $10^{16}$), the static decay times were excellent, well under the preferred 2000 ms or less, even after the hot oven abuse or the water shower abuse. As for the film sample that would not accept a full charge after day 4 of the hot dry oven, while it is not intended to be bound to any theory, it is believed this happened due to a mechanical difficulty in that the sample was placed in the test meter in a curved or bowed position instead of a flat, taut position, with respect to the sensing electrode. (It is also noted that 2 similar 5-layer films were made, the only difference being that core layer 3 contained only 5% of the premix of EVA+EAA+QA or contained no premix of EVA+EAA+QA. These similar films performed substantially the same, but for not accepting a full charge during the SDT test after 10 to 12 days in a hot dry oven. While it is not intended to be bound to any theory, it is believed this was also due to a mechanical difficulty in that samples were placed in the test meter in a bowed position.)

EXAMPLE III(i)

Coated samples of cardboard are prepared by laminating the film of Example III thereto. These samples should exhibit excellent adhesion to a film of zinc methacrylate ionomer of EMAA when tested on an Ampack skin packaging machine.

EXAMPLE IV

Six tubes of a 5-layer film were made as in Example III, but containing the following amounts of ingredients for each layer as recited in Table IVA below:

TABLE IVA

| Layer 1 | Layer 2 | Layer 3 | Layer 4 | Layer 5 |
|---|---|---|---|---|
| 90% EVA 10% Antiblock | 66⅔% EVA 33⅓% Mix of EVA + EAA + QA | 90% LLDPE 10% Mix of EVA + EAA + QA | 66⅔% EVA 33⅓% Mix of EVA + EAA + QA | 90% EVA 10% Antiblock |

Samples of the 6 tubes of the 5-layer film were tested for static decay time after 1 hour of equilibration and the results were as reported in Table IVB below:

TABLE IVB

| SAMPLE OF FILM | SDT (ms) |
|---|---|
| Tube 1 | 14 |
| Tube 2 | 43 |
| Tube 3 | 9 |
| Tube 4 | 23 |
| Tube 5 | 31 |
| Tube 6 | 18 |

As can be seen, excellent SDT's were obtained.

Next 3 sets of 4 samples each of the 6 tubes of 5-layer Film were subjected to a 24-hour water shower. Then, each set was equilibrated for 1 hour, 24 hours, and 48 hours, respectively and then checked for SDT. The results were as reported in Table IVC below:

TABLE IVC

| Tube | Sample | After 1 Hour Equilibration | After 24 Hours Equilibration | After 48 Hours Equilibration |
|---|---|---|---|---|
| 1 | 1 | Less Than MMSDT* | 24 | 29 |
| 1 | 2 | Less Than MMSDT | 23 | 41 |
| 1 | 3 | Less Than MMSDT | 15 | 23 |
| 1 | 4 | Less Than MMSDT | 16 | 24 |
| 2 | 1 | Less Than MMSDT | 60 | 54 |
| 2 | 2 | Less Than MMSDT | 54 | 50 |
| 2 | 3 | Less Than MMSDT | 71 | 66 |
| 2 | 4 | Less Than MMSDT | 70 | 71 |
| 3 | 1 | Less Than MMSDT | 18 | 16 |
| 3 | 2 | Less Than MMSDT | 17 | 20 |
| 3 | 3 | Less Than MMSDT | 13 | 20 |
| 3 | 4 | Less Than MMSDT | 11 | 18 |
| 4 | 1 | Less Than MMSDT | 76 | 78 |
| 4 | 2 | Less Than MMSDT | 38 | 32 |
| 4 | 3 | Less Than MMSDT | 53 | 60 |
| 4 | 4 | Less Than MMSDT | 84 | 85 |
| 5 | 1 | Less Than MMSDT | 69 | 65 |
| 5 | 2 | Less Than MMSDT | 84 | 76 |
| 5 | 3 | Less Than MMSDT | 32 | 30 |
| 5 | 4 | Less Than MMSDT | 33 | 34 |
| 6 | 1 | Less Than MMSDT | 106 | 108 |
| 6 | 2 | Less Than MMSDT | 114 | 136 |
| 6 | 3 | Less Than MMSDT | 64 | 92 |
| 6 | 4 | Less Than MMSDT | 152 | 161 |

*MMSDT = Minimum measurable static decay time

As can be seen, when film was left to equilibrate for 24 hours, which is as per the specifications of Federal Test Method 101c, then excellent SDT's were obtained. Also, the film retained excellent SDT's even after further Equilibration. Thus, these films indeed survived the vigorous abuse of a 24 hour water shower.

EXAMPLE IV(i)

Coated samples of cardboard are prepared by laminating the film of Example IV thereto. These samples should exhibit excellent adhesion to a film of zinc methacrylate ionomer of EMAA when tested on an Ampack skin packaging machine.

EXAMPLE V

For polycarbonate compatibility, i.e. crazing tests, also a mono-layer film was extruded from the pellets of premix having the ingredients as recited in Table V-A below:

TABLE V-A 60 parts by wt LLDPE [Dowlex 2045.03]
15 parts by wt QA [Q-14-2]
30 parts by wt EAA [Primacor 5981]

and then both a sample from Tube 1 of the 5-layer film of Example IV and a sample from the mono-layer film were tested for crazing of polycarbonate. The results are summarized in Table V-B below:

TABLE V-B

| Test Conditions | | Tube 1 of | |
|---|---|---|---|
| | Pressure | 5-layer | Mono-layer |
| Temperature | PSI | kg/cm$^2$ | Film | Film |
| 73° F.(22.8° C.) | 1000 | 70 | N | N |
| | 1700 | 120 | N | N |
| | 2000 | 141 | N | N |
| | 2500 | 176 | N | N |
| | 3400 | 239 | N | N |
| 120° F.(48.9° C.) | 1000 | 70 | N | N |
| | 1700 | 120 | N | N |
| | 2000 | 141 | N | N |
| | 2500 | 176 | N | N |
| | 3400 | 239 | VSLC | N |
| 158° F.(70° C.) | 1000 | 70 | N | N |
| | 1700 | 120 | N | N |
| | 2000 | 141 | N | VSLC |
| | 2500 | 176 | N | VSLC |
| | 3400 | 239 | VSLC | VSLC |
| 185° F.(85° C.) | 1000 | 70 | N | N |
| | 1700 | 120 | N | N |
| | 2000 | 141 | N | VSLC |
| | 2500 | 176 | VSLC | VSLC |
| | 3400 | 239 | VSLC | SLC |

N = NO ATTACK
VSLC = VERY SLIGHT CRAZE
SLC = SLIGHTLY CRAZED

As can be seen the 5-layer film D performed excellently and did not exhibit very slight crazing till the most extreme condition of 3400 psi, whereas the monolayer film only showed very slight crazing beginning at a less extreme condition of 2000 psi.

EXAMPLE V(i)

Coated samples of cardboard are prepared by laminating the film of Example V thereto. These samples should exhibit excellent adhesion to a film of zinc methacrylate ionomer of EMAA when tested on an Ampack skin packaging machine.

EXAMPLE VI

Quaternary amine additives QA1-QA5 (below) were prepared by mixing the following TA's (tertiary amines) and acids or alkylating agents without solvent for the indicated time/temp.

TABLE VIA

| QA | Formula | TA (gms) | Acid or Alkylating Agent (gms) | Time/Temp. |
|---|---|---|---|---|
| QA1 | $H(CH_2)_{12}N(CH_3)_2H^+$ $CH_3SO_3^-$ | Empigen AB (8.8) | MSA (3.2) | 10 min./60° C. |
| QA2 | $H(CH_2)_{12}N(CH_3)_2C_2H_5^+$ $C_2H_5OSO_3^-$ | Empigen AB (8.8) | DES (5.2) | 16 hr/60° C. |
| QA3 | $H(CH_2)_{12-18}(OC_2H_4)_{1-5}$ $N(CH_3)_2H^+CH_3SO_3$ | Empigen AY (14.4) | MSA (3.2) | 10 min/60° C. |
| QA4 | $C_{10}H_{21}OC_3H_6N(C_2H_4OH)_2H^+$ $CH_3SO_3^-$ | E14-2 (12.4) | MSA (3.2) | 10 min/60° C. |
| QA5 | $C_{10}H_{21}OC_3H_6N(C_2H_4OH)_2H^+$ $H(CH_2)_{12-18}C_6H_4SO_3^-$ | E14-2 (12.4) | DBSA (10.0) | 10 min/60° C. |

Several quaternary amines (QA, 3.6 parts by weight) were blended with Primacor 5981 ethylene-acrylic acid copolymer (7.1 parts by weight) and LD318.92 ethylene-vinyl acetate copolymer (89.3 parts by weight). The blending was carried out by kneading at 130°–150° C. for approximately 20 minutes in a Brabender Plasticorder (R) mixer. Samples of the resultant materials were pressed at approximately 1,000 psi (70 kg/cm) between platens heated to 150° C. Monolayer films of about 3 inches (7.6 cm) by 5 inches (12.7 cm) by 0.005 inch (0.013 cm) were thus obtained. The SDT of each film was determined before and after a 24-hour water shower. The results are summarized below:

TABLE VIB

| Sample | QA | SDT Before Shower (ms) | SDT After Shower (ms) |
|---|---|---|---|
| 1 | QA5 | 490 | 2450 |
| 2 | QA4 | 40 | 1000 |
| 3 | QA1 | 90 | 510 |
| 4 | QA2 | 100 | 880 |

These results demonstrate that the performance of the films tested was slightly degraded by an extensive water shower, but still less than 3000 ms for Sample 1 and less than the preferred 2000 ms for Samples 2, 3, and 4.

Next, several quaternary amines (QA 5.0 parts by weight) were blended with Primacor 1410 ethylene-acrylic acid copolymer (71.3 parts by weight) and LD318.92 ethylene-vinyl acetate copolymer (23.7 parts by weight). The blending and subsequent film preparation and testing were carried out as described above for the samples reported in Table VIB. The results were as follows:

TABLE VIC

| Sample | QA | SDT Before Shower (ms) | SDT After Shower (ms) |
|---|---|---|---|
| 5 | Cyastat LS | 420 | 500 |
| 6 | Larostat 264A | 590 | 630 |
| 7 | QA3 | 110 | 650 |
| 8 | QA1 | 550 | 720 |
| 9 | QA2 | 70 | 180 |

These results demonstrate that there was almost no loss of static decay performance after extensive water washing, and all SDT's were less than the preferred 2000 ms.

To demonstrate further permanence of these materials, the same samples 5 through 9 from after the water shower were further aged for 12 days in an oven at 70° C. and ambient humidity, i.e. a "dry" oven as there was no water beaker. SDT, surface resistivity, and volume resistivity for the resulting films are given below:

TABLE VID

RESULTS AFTER WATER SHOWER AND 12-DAY AGING AT 70° C.

| Sample | SDT (ms) | Surface Resistivity (ohms/square) | Volume Resistivity (ohm-cm) |
|---|---|---|---|
| 5 | 1660 | $1.1 \times 10^{13}$ | $4.4 \times 10^{12}$ |
| 6 | 1790 | $4.0 \times 10^{12}$ | $1.3 \times 10^{12}$ |
| 7 | 330 | $3.8 \times 10^{11}$ | $7.7 \times 10^{11}$ |
| 8 | 790 | $4.7 \times 10^{11}$ | $9.1 \times 10^{11}$ |
| 9 | 120 | $3.8 \times 10^{11}$ | $1.1 \times 10^{11}$ |

The results demonstrate that films produced with 5% of a QA additive in an EAA/EVA resin show excellent static decay times, surface resistivities, and volume resistivities, and are highly permanent, i.e., insensitive to water washout of additive and 12-day aging at elevated temperature.

EXAMPLE VI (i)

Coated samples of cardboard are prepared by laminating the films of Example VI thereto. These samples should exhibit excellent adhesion to a film of zinc methacrylate ionomer of EMAA when tested on an Ampack skin packaging machine.

COMPARATIVE EXAMPLE VII

A comparative sample was run for comparison with Sample 5 as reported in Tables VIC and VID above to show the result of omitting the ethylene-acrylic acid copolymer from the formulation. Thus, Cyastat LS (5.0 parts by weight) and LD318.92 ethylene-vinyl acetate copolymer (95.0 parts by weight) were kneaded at 130°-150° C. in a Brabender Plasticorder (R) mixer. Effective mixing of these ingredients was never obtained, even after 4 hours of kneading. Reduction of the additive content to 2.5 parts by weight did not solve the problem. This demonstrates that an acid copolymer containing carboxylic acid moieties (i.e. the ethylene-acrylic acid copolymer) plays a critical role in compatibilizing the polyolefin with the ionic additive.

Another comparative sample was run but this time for comparison with Sample 9 as reported in Tables VIC and VID above to show the result of omitting the ethylene-acrylic acid copolymer from the formulation. Thus, QA2 (1.5 parts by weight) and LD318.92 ethylene-vinyl acetate copolymer (98.5 parts by weight) were kneaded at 130°-150° C. in a Brabender Plasticorder (R) mixer. Effective mixing of these ingredients was obtained, finally after 4 hours of kneading. Some of the resultant material was pressed at approximately 1000 psi (70 kg/cm²) between platens heated to 150° C. Mono-layer film of about 3×5×0.005 inches (7.6×12.7×0.013 cm) was thus obtained. The SDT of each film was determined before and after a 24-hour water shower. The results are summarized below:

TABLE VII

| SDT Before Shower (ms) | SDT After Shower (ms) |
|---|---|
| 580 | over 30000 |

Also, after the water shower, the film held a charge of 10 kilovolts, which indicates the antistatic property was lost. This demonstrates that an acid copolymer containing carboxylic acid moieties (i.e. the ethylene-acrylic acid copolymer) plays a critical role in providing permanent antistatic characteristics, i.e. enabling the film still to have a SDT less than about 3000 ms, more preferably less than about 2000 ms, after a 24-hour water shower.

EXAMPLE VIII

Quaternary amine QA2 (as defined in Table VIA, 6.0 parts) was blended with Surlyn 1650 partially zinc neutralized ethylene-methacrylic acid-zinc methacrylate ionomer (23.5 parts) and LD318.92 ethylene-vinyl acetate copolymer (70.5 parts). The blending and subsequent testing were carried out as described in Example VI. The results were as follows:

| Before Water Shower: | |
|---|---|
| SDT (ms) | 470 |
| Surface Resistivity (ohms/square) | $1.7 \times 10^{12}$ |
| Volume Resistivity (ohm-cm) | $2.5 \times 10^{12}$ |
| After 24-Hour Water Shower: | |
| SDT (ms) | 880 |
| Surface Resistivity (ohms/square) | $7.6 \times 10^{12}$ |
| Volume Resistivity (ohm-cm) | $3.6 \times 10^{10}$ |
| After 24-Hour Water Shower Followed by 12-Day/70° C. Aging: | |
| SDT (ms) | 460 |
| Surface Resistivity (ohms/square) | $1.7 \times 10^{12}$ |
| Volume Resistivity (ohm-cm) | $2.5 \times 10^{12}$ |

These results demonstrate that the film showed excellent static decay time, surface and volume resistivity, and resistance to water washout of additive and aging at elevated temperature.

EXAMPLE VIII(i)

Coated samples of cardboard are prepared by laminating the film of Example VIII thereto. These samples should exhibit excellent adhesion to a film of zinc methacrylate ionomer of EMAA when tested on an Ampack skin packaging machine.

EXAMPLE IX

Quaternary amine QA1 (5.0 parts) was blended with Surlyn 1650 partially zinc neutralized ethylene-methacrylic acid-zinc methacrylate ionomer (23.7 parts) and LD318.92 ethylene-vinyl acetate copolymer (71.3 parts). The blending and subsequent testing were carried out as described in Example VI. The results were as follows:

| Before Water Shower: | |
|---|---|

-continued

| | |
|---|---|
| SDT (ms) | 230 |
| Surface Resistivity (ohms/square) | $5.2 \times 10^{11}$ |
| Volume Resistivity (ohm-cm) | $1.4 \times 10^{12}$ |
| After 24-Hour Water Shower: | |
| SDT (ms) | 150 |
| Surface Resistivity (ohms/square) | $6.5 \times 10^{11}$ |
| Volume Resistivity (ohm-cm) | $1.1 \times 10^{12}$ |
| After 24-Hour Water Shower Followed by 12-Day/70° C. Aging: | |
| SDT (ms) | 80 |
| Surface Resistivity (ohms/square) | $5.9 \times 10^{11}$ |
| Volume Resistivity (ohm-cm) | $5.9 \times 10^{12}$ |

These results demonstrate that the film showed excellent static decay time, surface and volume resistivity, and resistance to water washout of additive and aging at elevated temperature.

EXAMPLE IX(i)

Coated samples of cardboard are prepared by laminating the film of Example IX thereto. These samples should exhibit excellent adhesion to a film of zinc methacrylate ionomer of EMAA when tested on an Ampack skin packaging machine.

EXAMPLE X

Quaternary amine QA6, N,N-dimethyl-N-ethyl-N-cocoammonium ethosulfate, was prepared as follows: 9.36 g of N,N-dimethylcocoamine was combined with 6.10 g of diethyl sulfate. After mixing at 80° C. for 2-3 minutes, a clear liquid was formed in an exothermic process. On cooling, a waxy solid (m.p. 65°-75° C.) resulted (QA6).

Quaternary amine QA6 (4.44 g) was blended with 10 g Dow Primacor 1410 (ethylene-acrylic acid copolymer, 9% AA, 1.5 melt index) and 30 g Exxon LD318.92 (ethylene-vinyl acetate copolymer, 9% VA, 2.0 melt index). Blending was carried out in a Brabender Plasticorder mixer at 130° C. for 30 minutes. A sample of the resultant material was pressed at approximately 1,000 psi (70 kg/cm$^2$) between platens heated to 150° C. A monolayer film of about 3 inches (7.6 cm) by 5 inches (12.7 cm) by 0.005 inch (0.013 cm) was thus obtained.

The surface resistivity of the sample was tested by two methods: First, the sample was equilibrated at 12.5 ±0.5% RH for 48 hours and tested with a Keithley 6105 resistivity adapter (Keithley Instruments, Cleveland, Oh.) connected to a Keithley 247 high voltage supply and a Keithley 485 picoammeter. With an applied voltage of 100 volts, a surface resistivity of $9.96 \times 10^9$ ohms/square was obtained. Second, the sample was equilibrated at 35 ±5% RH for >2 hours and tested with a TREK model 150 resistivity meter (TREK, Inc., Medina, NY). A surface resistivity of $9 \times 10^7$ ohms/square was obtained.

EXAMPLE X(i)

Coated samples of cardboard are prepared by laminating the film of Example X thereto. These samples should exhibit excellent adhesion to a film of zinc methacrylate ionomer of EMAA when tested on an Ampack skin packaging machine.

EXAMPLE XI

Quaternary amine QA6 (4.44 g) was blended with 10 g Surlyn 1650 partially zinc neutralized ethylene-methacrylic acid-zinc methacrylate terpolymer and 30 g Exxon LD318.92 as described in Example X.

When prepared and tested as described in Example X, a film sample of this material gave the following results:

Surface Resistivity after equilibration at 12.5 ± 0.5% RH for 48 hrs.: $2.00 \times 10^{10}$ ohms/square Surface Resistivity after equilibration at 35 ± 5% RH>2 hrs.: $2 \times 10^8$ ohms/square

EXAMPLE XI(i)

Coated samples of cardboard are prepared by laminating the following film of thereto. These samples will exhibit excellent adhesion to a film of zinc methacrylate ionomer of EMAA when tested on an Ampack skin packaging machine.

EXAMPLE XII

By blending with heat using a Berstorff twin screw extruder, a premix of pellets was made. First, 60 parts by weight EVA (LD318.92) and 30 parts by weight EAA (Primacor 5981) were mixed, and then added thereto was 20 parts by wt. QA Emerstat 6660. The resultant EVA+EAA+QA was then further blended with more polymer, and hot blown, 5-layer, extruded, tubular film having a thickness of about 4 mil (0.102 mm) was made. The ingredients of each layer were as recited in Table XIIA and are in % by weight.

TABLE XIIA

| OUTSIDE LAYER 1 | INTERIOR LAYER 2 | CORE LAYER 3 | INTERIOR LAYER 4 | OUTSIDE LAYER 5 |
|---|---|---|---|---|
| 100% EVA | 100% EVA | 100% LLDPE | 100% EVA | 66⅔% EVA 33⅓% Mix of EVA + EAA + QA |

Then, the following electrical measurements were taken on samples of film as reported in Table XIIB. Resistivity was measured at about 12.5±2.5% RH using a Keithley picoammeter with a separate 100 volt power source and an Electro Technical Services cell conforming to ASTM D257. Testing for triboelectric charging was against aluminum plates.

TABLE XIIB

| Abuse Treatment or Film Tested | Ohms/square Surface Resistivity | Ohms-cm Volume Resistivity | Static Decay Time (ms) | | | Tribo Volts |
| | | | 1 Hr. Equilibration treatment | 24 Hr. Equilibration treatment | 48 Hr. Equilibration treatment | |
|---|---|---|---|---|---|---|
| As is | $5.9 \times 10^{11}$ | $1.8 \times 10^{16}$ | 1852 | 1824 | NT$^a$ | 86 |
| 24 Hr. Shower | $1.9 \times 10^{14}$ | NT | NT | WON'T ACCEPT | WON'T ACCEPT | NT |

TABLE XIIB-continued

| Abuse Treatment or Film Tested As is | Ohms/square Surface Resistivity | Ohms-cm Volume Resistivity | Static Decay Time (ms) | | | Tribo Volts |
|---|---|---|---|---|---|---|
| | | | 1 Hr. Equilibration treatment | 24 Hr. Equilibration treatment | 48 Hr. Equilibration treatment | |
| | | | | FULL CHARGE | FULL CHARGE | |
| Hot Dry Oven | | | | | | |
| Day 1 | NT | NT | 2190 | 1722 | NT | NT |
| Day 2 | NT | NT | 1492 | 3000 | NT | NT |
| Day 3 | NT | NT | 1471 | 1398 | NT | NT |
| Day 4 | NT | NT | 1326 | 1332 | NT | NT |
| Day 5 | NT | NT | 1501 | 1453 | NT | NT |
| | NT | NT | NT | NT | NT | NT |
| | NT | NT | NT | NT | NT | NT |
| | NT | NT | NT | NT | NT | NT |
| | NT | NT | NT | NT | NT | NT |
| | NT | NT | NT | 1845 | NT | NT |
| | NT | NT | NT | 1794 | NT | NT |
| | $1.0 \times 10^{12}$ | $2.3 \times 10^{16}$ | NT | 15940 | NT | 537 | results illustrate that after 11 days in a hot ... film exhibited an excellent SDT less than 2000

EXAMPLE XII(i)

Coated samples of cardboard are prepared by laminating the film of Example XII thereto. These samples should exhibit excellent adhesion to a film of zinc methacrylate ionomer of EMAA when tested on an Ampack skin packaging machine.

EXAMPLE XIII

By blending with heat using a Berstorff twin screw extruder, a premix of pellets was made. First, 60 parts by weight EVA LD318.92 and 30 parts by weight EAA Primacor 5981 were mixed, and then added thereto was 20 parts by wt. QA Emerstat 6660. The resultant mix of EVA+EAA+QA was then further blended with more polymer, and hot blown, 5-layer extruded, tubular film having a thickness of about 4 mil (0.102 mm) was made. The ingredients of each layer were as recited in Table XIIIA and are in % by weight.

TABLE XIIIA

| OUTSIDE LAYER 1 | INTERIOR LAYER 2 | CORE LAYER 3 | INTERIOR LAYER 4 | OUTSIDE LAYER 5 |
|---|---|---|---|---|
| 66⅔% Primacor 1410 | 66⅔% EVA | 100% LLDPE | 66⅔% EVA | 66⅔% Prmacor 1410 |
| 33⅓% Mix of EVA + EAA + QA | 33⅓% Mix of EVA + EAA + QA | | 33⅓% Mix of EVA + EAA + QA | 33⅓% Mix of EVA + EAA + QA |

Then, the following electrical measurements were taken on samples of film as reported in Table XIIIB. Resistivity was measured at about 12.5 ± 2.5% RH using a Keithley picoammeter with a separate 100 volt power source and an Electro Technical Services cell conforming to ASTM D257. Testing for triboelectric charging was against aluminum plates.

TABLE XIIIB

| Abuse Treatment or Film Tested As is | Ohms/square Surface Resistivity | Ohms-cm Volume Resistivity | Static Decay Time (ms) | | | Tribo Volts |
|---|---|---|---|---|---|---|
| | | | 1 Hr. Equilibration treatment | 24 Hr. Equilibration treatment | 48 Hr. Equilibration treatment | |
| As is | $1.3 \times 10^{11}$ | $5.1 \times 10^{13}$ | 40 | 80 | NT* | 47 |
| 24 Hr. Shower | $7.9 \times 10^{11}$ | NT | NT | 109 | 108 | NT |
| Hot Dry Oven | | | | | | |
| Day 1 | NT | NT | 217 | 185 | NT | NT |
| Day 2 | NT | NT | 130 | 181 | NT | NT |
| Day 3 | NT | NT | 68 | 64 | NT | NT |
| Day 4 | NT | NT | 73 | 84 | NT | NT |
| Day 5 | NT | NT | 86 | 88 | NT | NT |
| Day 6 | NT | NT | 107 | NT | NT | NT |
| Day 7 | NT | NT | NT | NT | NT | NT |
| Day 8 | NT | NT | NT | NT | NT | NT |
| Day 9 | NT | NT | NT | NT | NT | NT |
| Day 10 | NT | NT | NT | 84 | NT | NT |
| Day 11 | NT | NT | NT | 94 | NT | NT |

TABLE XIIIB-continued

| Abuse Treatment or Film Tested As is | Ohms/square Surface Resistivity | Ohms-cm Volume Resistivity | Static Decay Time (ms) | | | Tribo Volts |
|---|---|---|---|---|---|---|
| | | | 1 Hr. Equilibration treatment | 24 Hr. Equilibration treatment | 48 Hr. Equilibration treatment | |
| Day 12 | $1.6 \times 10^{11}$ | $2.1 \times 10^{13}$ | NT | 51 | NT | 56 |

*NT = not tested

These results illustrate that after a 24-hour water shower and also after 12 days in a hot oven, the film exhibited both a permanent antistatic SDT less than 2000 ms and a permanent surface resistivity in the antistatic surface resistivity range of $10^5$ to $10^{12}$ ohms/square.

EXAMPLE XIII(i)

Coated samples of cardboard are prepared by laminating the film of Example XIII thereto. These samples should exhibit excellent adhesion to a film of zinc methacrylate ionomer of EMAA when tested on an Ampack skin packaging machine.

EXAMPLE XIV

By blending with heat using a Berstorff twin screw extruder, a premix of pellets was made. First, 60 parts by weight EVA [LD318.92] and 30 parts by weight EAA [Primacor 5981] were mixed, and then added thereto was 20 parts by wt. QA [Emerstat 6660]. The resultant mix of EVA+EAA+QA was then further blended with more polymer, and hot blown, 5-layer, extruded, tubular film having a thickness of about 4 mil (0.102 mm) was made. The ingredients of each layer were as recited in Table XIVA and are in % by weight.

Then, the following electrical measurements were taken on samples of film as reported in Table XIVB. Resistivity was measured at about 12.5 ± 2.5% RH using a Keithley picoammeter with a separate 100 volt power source and an Electro Technical Services cell conforming to ASTM D257. Triboelectric charging was tested against aluminum plates.

TABLE XIVB

| Abuse Treatment or Film Tested As is | Ohms/square Surface Resistivity | Ohms-cm Volume Resistivity | Static Decay Time (ms) | | | Tribo Volts |
|---|---|---|---|---|---|---|
| | | | 1 Hr. Equilibration treatment | 24 Hr. Equilibration treatment | 48 Hr. Equilibration treatment | |
| As is | $1.2 \times 10^{11}$ | $5.8 \times 10^{13}$ | 11 | 31 | NT* | 35 |
| 24 Hr. Shower Hot Dry Oven | $6.6 \times 10^{11}$ | NT | NT | 70 | 62 | NT |
| Day 1 | NT | NT | 40 | 26 | NT | NT |
| Day 2 | NT | NT | 42 | 32 | NT | NT |
| Day 3 | NT | NT | 41 | 40 | NT | NT |
| Day 4 | NT | NT | 36 | 33 | NT | NT |
| Day 5 | NT | NT | 52 | 42 | NT | NT |
| Day 6 | NT | NT | 53 | NT | NT | NT |
| Day 7 | NT | NT | NT | NT | NT | NT |
| Day 8 | NT | NT | NT | NT | NT | NT |
| Day 9 | NT | NT | NT | NT | NT | NT |
| Day 10 | NT | NT | NT | 45 | NT | NT |
| Day 11 | NT | NT | NT | 44 | NT | NT |
| Day 12 | $1.6 \times 10^{11}$ | $2.4 \times 10^{13}$ | NT | 65 | NT | 35 |

*NT = not tested

These results illustrate that after a 24-hour water shower and also after 12 days in a hot oven, the film exhibited both a permanent antistatic SDT less than 2000 ms and a permanent surface resistivity in the antistatic surface resistivity range of $10^5$ to $10^{12}$ ohms/square.

EXAMPLE XIV(i)

Coated samples of cardboard are prepared by laminating the film of Example XIV thereto. These samples should exhibit excellent adhesion to a film of zinc methacrylate ionomer of EMAA when tested on an Ampack skin packaging machine.

EXAMPLE XV

Primacor 5980 (900 g, 2.5 equiv. acrylic acid) and 25% aqueous tetramethylammonium hydroxide solution (866 ml, 2.38 equiv. hydroxide) were added to a 4-liter resin kettle containing 1567 ml distilled water.

TABLE XIVA

| OUTSIDE LAYER 1 | INTERIOR LAYER 2 | CORE LAYER 3 | INTERIOR LAYER 4 | OUTSIDE LAYER 5 |
|---|---|---|---|---|
| 56⅔% Primacor 1410 | 66⅔% EVA | 100% LLDPE | 66⅔% EVA | 56⅔% Primacor 1410 |
| 33⅓% Mix of EVA + EAA + QA | 33⅓% Mix of EVA + EAA + QA | | 33⅓% Mix of EVA + EAA + QA | 33⅓% Mix of EVA + EAA + QA |
| 10% Antiblock | | | | 10% Antiblock |

Primacor 5980 is an ethylene acrylic acid supplied by Dow Chemical. It is 20% by wt. acrylic acid and 80% by wt. ethylene, and has a melt index of 300. The mixture was mechanically stirred with heating at reflux for 7 hours, then cooled to room temperature. The resulting clear, viscous solution was directly painted onto $3\frac{1}{2} \times 5$ inch coupons of Lexan R polycarbonate. The coated coupons were equilibrated in a relative humidity controlled chamber and then tested for surface resistivity at 12.5% and 50% RH, and triboelectric charging against EVA film. The results are reported in Table XV-A.

TABLE XV-A

| Sample | Surface Resistivity (ohm/square) | | Triboelectric Charging volts (Avg of 4 tests) |
|---|---|---|---|
| | 12.5% RH | 50% RH | |
| 1 | $9.24 \times 10^9$ | $5.0 \times 10^8$ | 1263 |
| 2 | NT | NT | 465 |
| 3 (a) | $1.61 \times 10^{10}$ | NT | NT |
| 4 (b) | $2.18 \times 10^{10}$ | NT | NT |

(a) Before 12 day oven aging
(b) After 12 day oven aging

The results show the coating performed well as an antistatic coating in terms of surface resistivity, and was resistant to abusive aging.

EXAMPLE XV (i)

Coated samples of corrugated cardboard were prepared on a roller-coating apparatus at three coating weights (not quantified, but qualitatively designated "light", "medium", "heavy"). These coated cardboard samples exhibited excellent adhesion, at all coating weights, to a film of zinc ionomer of EMAA when tested on an Ampack skin-packaging machine.

EXAMPLE XVI

The triboelectric properties of the coating mixture described in Example XV were improved by the addition of an enhancer. Two percent by weight of the additive was mixed at room temperature with the coating material. The resultant was directly painted onto $3\frac{1}{2} \times 5$ inch coupons of Lexan R polycarbonate. The coated coupons were equilibrated in a relative humidity chamber and then tested for surface resistivity at 12.5% and 50% RH, and triboelectric testing against EVA film. A representative series of enhancers and the test results are reported in Table XVI-A.

TABLE XVI-A

| Additives | Surface Resistivity (ohms/sq) | | Triboelectric charging Against EVA film, Avg. of 4 trials (Volts) |
|---|---|---|---|
| | RH 12.5% | RH 50% | |
| Group I | | | |
| No Additive | $9.24 \times 10^9$ | $5.0 \times 10^8$ | 1263 |
| Tween 20 | $8.38 \times 10^9$ | $3.01 \times 10^7$ | 214 |
| Stepanol WAT | $4.32 \times 10^9$ | $1.76 \times 10^7$ | 425 |
| Glycerol | $1.66 \times 10^9$ | $6.13 \times 10^6$ | 488 |
| Ethylene Glycol | $3.71 \times 10^9$ | $6.0 \times 10^6$ | 500 |
| Propylene Glycol | $1.33 \times 10^9$ | $4.47 \times 10^6$ | 544 |
| Steol CA-460 | $1.58 \times 10^9$ | $4.07 \times 10^8$ | 644 |
| Tetraethylene Glycol | $4.08 \times 10^9$ | $1.79 \times 10^7$ | 694 |
| Bacote 20 | $1.45 \times 10^{10}$ | $2.67 \times 10^8$ | 694 |
| Hexcel 106G | $4.22 \times 10^9$ | $2.16 \times 10^7$ | 750 |
| Calfax 10L45 | $3.93 \times 10^9$ | $8.75 \times 10^8$ | 819 |
| Group II | | | |
| No Additive | — | — | 465 |
| Tween 20 | — | — | 18; 56* |
| Pluronic L-62 | $9.30 \times 10^9$ | $1.51 \times 10^7$ | 56; 164* |
| Miranol OS-D | $1.61 \times 10^{10}$ | $5.73 \times 10^7$ | 84 |
| Miranol CM-SF | $8.98 \times 10^9$ | $9.75 \times 10^6$ | 98 |
| Amphoteric L | $1.65 \times 10^{10}$ | $3.58 \times 10^7$ | 103 |
| Dow Stature | $6.13 \times 10^9$ | $1.56 \times 10^7$ | 133; 318* |
| Propylene Glycol | — | — | 162 |
| Stepanol DEA | $2.02 \times 10^{10}$ | $1.99 \times 10^7$ | 186 |
| Glycerol | — | — | 212 |
| AO-14-2 | $6.56 \times 10^9$ | $1.46 \times 10^7$ | 322 |
| Calfax 10L45 | — | — | 325 |
| Zonyl FSN | $9.24 \times 10^9$ | $8.12 \times 10^6$ | 372 |
| AO-728 | $2.22 \times 10^{10}$ | $1.65 \times 10^7$ | 426 |
| AO-14-2 | $6.56 \times 10^9$ | $1.46 \times 10^7$ | 701 |

*Duplicate samples were tested.

It should be noted that these tribo values were not "exact" numbers, as they depend on a variety of factors. For example, the differences noted between groups of samples show that coating thickness can make a difference; Group I coatings were thicker than Group II. Also, if any pinholes of polycarbonate were exposed, a dramatic charging effect could occur. Viewing each series of numbers independently, it becomes apparent that the addition of certain enhancers improves the triboelectric charging properties of the coating relative to the original sample. The largest degree of improvement is seen with Tween 20, polyoxyethylene (20) sorbitan monolaurate. Although some of the enhancers may also improve surface resistivity as well, this improvement is not a determinant of their usefulness, and it does not correlate with triboelectric charging improvements.

EXAMPLE XVII

To further test the coatings of Examples XV and XVI, two small cardboard boxes were prepared. One was coated with the Example XV coating material and one with the Tween 20 enhanced formulation of Example XVI. These boxes, and an uncoated box, were tested for surface resistivity, volume resistivity, static decay time, charge retention, and tribo charging against: solder masked circuit board, aluminum, ceramic integrated circuit and copper. See Table XVII-A.

TABLE XVII-A

| | | Coated Box (no enhancer) | Coated Box (Tween 20 enhancer) | Uncoated Box (control) |
|---|---|---|---|---|
| Surface Resistivity (ohm/sq) | 50% RH | $7.46 \times 10^9$ | $6.57 \times 10^9$ | $6.37 \times 10^{11}$ |
| | 12.5% RH | $1.45 \times 10^{11}$ | $2.03 \times 10^{11}$ | $2.20 \times 10^{13}$ |
| Volume Resistivity (ohm/cm) | 50% RH | $8.90 \times 10^{11}$ | $2.84 \times 10^{11}$ | $4.72 \times 10^{12}$ |
| | 12.5% RH | $4.91 \times 10^{12}$ | $5.10 \times 10^{12}$ | $1.67 \times 10^{13}$ |

TABLE XVII-A-continued

| | | Coated Box (no enhancer) | Coated Box (Tween 20 enhancer) | Uncoated Box (control) |
|---|---|---|---|---|
| Static Decay Time | 50% RH | 14 | 17 | 31 |
| (ms) | 12.5% RH | 895 | 902 | 1268 |
| Tribocharging (volts) | | | | |
| Solder Masked Circuit Board | | 577 | 356 | 1061 |
| Aluminum | | 4 | 3 | 84 |
| Ceramic Integrated Circuit | | 694 | 384 | 117 |
| Copper | | 4 | 3 | −86 |
| Charge retention (residual voltage after 2000 volts applied) | | | | |
| Seconds after elec- | 1 sec | 0 volts | 0 volts | 1500 volts |
| trically grounding | 2 | 1 | 0 | 1200 |
| the charged sample | 3 | 0 | 0 | 1000 |
| | 4 | 0 | 0 | 800 |
| | 5 | 0 | 0 | 600 |

These results indicate that both coated boxes were better than an uncoated cardboard box, and further demonstrated the usefulness of the Tween 20 ethoxylated sorbitan ester as an enhancer for minimizing triboelectric charging.

EXAMPLE XVIII

In a similar fashion to Example XV, several anhydride-containing copolymers and carboxylic acid containing copolymers were reacted with either an organic or inorganic base in water. The resulting clear solution were directly painted onto 3½ inch ×5 inch coupons of Lexan R polycarbonate. The coated coupons were equilibrated in a relative humidity controlled chamber at 12.5% RH and then tested for surface resistivity. The results are given in Table XVIII-A.

TABLE XVIII-A

| Polymer | Base | Surface Resistivity (ohms/sq) |
|---|---|---|
| P5981 (5 g) | TMAH.5H$_2$O (2.52 g) | 3.07 × 10$^{11}$ |
| P5981 (5 g) | TEAH (5.11 g, 40% aq) | 7.13 × 10$^{10}$ |
| P5981 (5 g) | Benzyltrimethyl Ammonium Hydroxide (5.81 g, 40% aq) | 1.10 × 10$^{12}$ |
| P5981 (5 g) | CsOH (4.16 g, 50% aq) | 9.27 × 10$^{11}$ |
| P5981 (5 g) | Triethanolamine (2.07 g) | 2.16 × 10$^{11}$ |
| P5981 (5 g) | TBAH (6.55 g, 55% aq) | 3.68 × 10$^{12}$ |
| SMA 1000 (5 g) | Triethanolamine (7.38 g) | 2.68 × 10$^{11}$ |
| MA 1000 (5 g) | NaOH (1.03 g) | 4.58 × 10$^{11}$ |
| SMA 1000 (5 g) | KOH (1.40 g) | 7.25 × 10$^{11}$ |
| SMA 1000 (5 g) | CsOH (7.42 g, 50% aq) | 9.08 × 10$^{11}$ |
| SMA 2000 (5 g) | NaOH (0.625 g) | 8.0 × 10$^{11}$ |
| SMA 1440 (5 g) | NaOH (0.67 g) | 1.0 × 10$^{12}$ |
| SMA 1440 (5 g) | TMAH (5.70, 25% aq) | 3.0 × 10$^{11}$ |
| SMA 2625 (5 g) | NaOH (.79 g) | 6.0 × 10$^{10}$ |
| SMA 2625 (5 g) | TMAH (7.16 g, 25% aq) | 3 × 10$^{10}$ |
| SMA 17352 (5 g) | NaOH (0.964 g) | 1 × 10$^{10}$ |
| SMA 17352 (5 g) | TMAH (8.79 g, 25% aq) | 1 × 10$^{10}$ |
| Allied AC143 (5 g) | TMAH (1.94 g, 25% aq) | 7.32 × 10$^{11}$ |

EXAMPLE XIX

EPG-112 has been commerically available from the Cryovac Division of W. R. Grace & Co.-Conn. EPG-112 was a coextruded, hot blown, 5-layer symmetric film of the structure: A/B/C/B/A made in thicknesses of 2.0, 3.0, and 4.0 mils, where the percentages recited below were in % by weight.

Layer A: Composed of EVA, EAA, antiblock, antistatic agent

EVA: 30% of Layer A

| | |
|---|---|
| Density: | 0.929 to 0.931 g/ml |
| VA Content: | 9.0 ± 0.5% |
| Melt Index: | 1.8 to 2.2 g/10 min., ASTM D-1238 |

EAA: 52.5% of Layer A

| | |
|---|---|
| Density: | 0.938 g/ml |
| Acrylic Acid Content: | 9.5% |
| Vicat Softening Point: | 180° F. |
| Melt Index: | 1.5 ± 0.5 g/10 min., ASTM D-1238 |

Antiblock Masterbatch - Silica Dispersion in Polyethylene: 10% of Layer A

| | |
|---|---|
| Density of Antiblock Masterbatch: | 0.96 to 0.98 g/ml |
| Melting Point of Masterbatch: | Unknown |
| Silica Content: | 10% |
| Melt Index of Masterbatch: | 3.90 to 4.14 g/10 min., ASTM D-1238 |

Antistat: Modified Soya Dimethylethlammonium Ethosulfate: 7.5% of Layer A

| | |
|---|---|
| Density of Antistat: | 1.005 g/ml @25° C. |
| pH 35% Solution in Water: | 6.0-6.9 @25° C. |
| Boiling Point: | >300° F. |
| Melting Point: | 120° F. |

Layer B: Composed of EVA, EAA, and Antistatic Agent

EVA: 67% of Layer B

Same EVA as layer A

EAA: 24.7% of layer B

Same EAA as layer A

Antistatic Agent: 8.3% of layer B

Same antistatic agent as layer A

Layer C: Composed of LLDPE, EAA, Antistatic Agent

| | |
|---|---|
| LLDPE: 90% of layer C | |
| Density: | 0.918 to 0.922 g/ml |
| Melting Point: | 123-126° C., DSC 2nd heat |
| Melt Index: | 1.1 ± 1 g/10 min. |
| Octene Comonomer Content: | 6.5 ± 0.5% |
| EAA: 7.5% of layer C | |
| Same EAA as layer A | |
| Antistatic Agent: 2.5% of layer C | |
| Same antistatic agent as layer A | |

EXAMPLE XIX(i)

Coated samples of cardboard were prepared wherein the film of Example XIX, namely 4 mil EPG-112 was then adhesively laminated to cardboard using a dextrin adhesive (the ordinary "paper-to-paper" dextrin adhesive is commercially available under the tradename Dextrin 12-0095 from National Starch). Subsequently, a one-inch wide sample was cut, and with the aid of solvents, the EPG-112 was separated from the cardboard for a distance of about one inch with the remainder of the sample strip staying bonded, the separated portions forming grip tabs. After the solvent had been sufficiently dried and removed from the samples so that it would not affect the results, one tab was placed in one jaw of an Instron test machine and the other tab in the other jaw. The jaws were then separated and the threshold force to pull the layers apart recorded. At a draw rate of 5 inches/minute, at 73° F., this was 0.42 pounds. These samples exhibited excellent adhesion to the cardboard.

From the foregoing description, one skilled in the art can easily ascertain the essential characteristics of this invention, and without departing from the spirit and scope thereof, can make various changes and modifications of the invention to adapt it to various usages and conditions.

We claim:

1. A semi-rigid heat-sealable, laminate with permanent antistatic characteristics comprising a semi-rigid deformable substrate having a surface with a surface portion for supporting an item to be packaged, and a heat-sealable, permanently antistatic layer extending over and bonded to said surface, said layer including a modified acid copolymer selected from:
   (I) a mixture of (A) a polymer containing carboxyic acid moieties and (B) an antistatically effective amount of a quaternary amine; or from
   (II) an acid/base reaction product of (A) a polymer containing carboxylic acid moieties and (C) an antistatically effective amount of an organic base wherein (A), (B), and (C) are defined as follows:
   (A) the polymer containing carboxylic acid moieties is a copolymer of (i) an alpha-olefin of the formula $RCH{=}CH_2$ wherein R is H or $C_1$ to $C_{20}$ alkyl, $C_1$ to $C_{20}$ alkoxy, or $C_6$ aryl, and (ii) an alpha,beta-ethylenically unsaturated carboxylic acid, and
   (B) the quaternary amine is of the formula

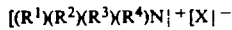

wherein
   $R^1$ is selected from H, aryl, or $C_1$ to $C_{50}$ alkyl optionally having one or more non-contiguous $C{=}O$ or $NHC{=}O$ or $-S-$ or $-O-$ in the carbon chain, or the same as $R^2$;

each of $R^2$, $R^3$, and $R^4$ is the same or different and selected from H, $C_1$ to $C_{18}$ alkyl optionally substituted with one or more OH or from $-(R^5-O)_a-H$ where a is an integer from 1 to 10 and $R^5$ is ethylene or propylene; and
   X is an anion selected from chloride, bromide, iodide, fluoride, nitrate, fluoborate, phosphate, $C_1$ to $C_{20}$ alkyl phosphate, sulfate, $C_1$ to $C_{20}$ alkyl sulfate, formate, $C_1$ to $C_{20}$ alkyl or $C_6$ to $C_{24}$ alkaryl or aryl sulfonate, acetate, trifluoroacetate, citrate, propionate, or tartrate, and
   (C) the organic base is of the formula $M^+ Y^-$, wherein $M^+$ is $[R^6R^7R^8R^9N]^+$, where $R^6$, $R^7$, $R^8$, and $R^9$ are independently selected from a $C_1$ to $C_4$ alkyl, benzyl, 2-hydroxyethyl, or hydroxypropyl, and $Y|^-$ is selected from hydroxide, $C_1$ to $C_4$ alkoxide, bicarbonate, or carbonate.

2. The laminate of claim 1 wherein the polymer containing carboxylic acid moieties is ethylene-acrylic acid or ethylene-methacrylic acid and the quaternary amine is of the formula wherein: $R^1$ is $C_4$ to $C_{30}$ alkyl, straight or branched optionally including one or more ether linkages and each of $R^2$, $R^3$ and $R^4$ is the same or different and selected from methyl or ethyl, and X is chloride, methyl sulfate, ethyl sulfate, methanesulfonate, or toluenesulfonate.

3. The laminate of claim 1 wherein the polymer containing carboxylic acid moieties is ethylene-acrylic acid or ethylene methacrylic acid and wherein $R^6$, $R^7$, $R^8$ and $R^9$ are selected from methyl, ethyl, or $C_2H_4OH$, and $Y|^-$ is hydroxide, methoxide, or ethoxide.

4. The laminate of claim 1 wherein the antistatic layer will exhibit polycarbonate compatibility and be free of causing crazing of polycarbonate at a stress condition of at least about 2500 psi (176 kg/cm$^2$) and 120° F. (48.9° C.).

5. The laminate of claim 1 wherein said laminate has the form of an X with a center including said surface portion, opposing first and second arms, each of said first and second arms foldable over said center or over the other arm of said first and second arms when said other arm is folded over said center, a third arm with a slotted opening, said third arm foldable over said center and said first and second arms when said first and second arms are folded, a fourth arm opposing said third arm and foldable over said third arm when said third arm is folded over said center and said first and second arms, and a tabl on said fourth arm for being received into said slotted opening to releasably close said package when said fourth arm is folded over said third arm.

6. A package constructed from the laminate of claim 1 wherein said surface includes a continuous border portion surrounding said surface portion, and when a static-sensitive item is placed on said surface portion to be packaged, said package further includes a sheet of flexible, heat-sealable, antistatic film vacuum formed over said surface portion and bonded to the portion of said anti-static layer extending over said border portion to form an enclosure over said surface portion, which contains the static sensitive item.

7. The laminate of claim 1 wherein the polymer containing carboxylic acid moieties is an ionomer containing carboxylic acid moieties partially neutralized by a metal salt.

8. The laminate of claim 1 wherein the antistatic layer will dissipate an applied charge of ±5000 Vdc in a static decay time less than about 3000 milliseconds and will have a surface resistivity from about $10^5$ to about $10^{12}$ ohms/square.

9. The laminate of claim 8 wherein the static decay time is less than about 3000 milliseconds and the surface resistivity is from about $10^5$ to about $10^{12}$ ohms/square, after a 24 hour water shower.

10. The laminate of claim 8 wherein the static decay time of less than about 3000 milliseconds and the surface resistivity is from about $10^5$ to about $10^{12}$ ohms/square, after 12 days in a hot oven of about 70° C.

11. The laminate of claim 1 wherein a triboelectric enhancer is present in the antistatic layer.

12. The laminate of claim 11, wherein said triboelectric enhancer is comprised of ethoxylated sorbitan ester, ethoxylated glycerol ester, coco amphopropionate, oleoamphopropyl sulfonate, or ethylene oxide propylene oxide copolymer.

13. A semi-rigid heat-sealable laminate with permanent anti-static characteristics comprising a semi-rigid deformable substrate having a surface with a surface portion for supporting an item to be packaged, and a heat-sealable, permanently antistatic layer extending over and bonded to said surface, said layer being resultant from mixing with heat, optionally with solvent, (A) a polymer containing carboxylic acid moieties and an antistatically effective amount of a modifier selected from either (B) a quaternary amine or (C) an organic base wherein (A), (B), and (C) are defined as follows:

(A) the polymer containing carboxylic acid moieties is a copolymer of (i) an alpha-olefin of the formula $RCH=CH_2$ wherein R is H or $C_1$ to $C_{20}$ alkyl, $C_1$ to $C_{20}$ alkoxy, or $C_6$ aryl and (ii) an alpha,beta-ethylenically unsaturated carboxylic acid, and (B) the quaternary amine is of the formula $$(R^1)(R^2)(R^3)(R^4)N|^+ \ X|^-$$

wherein $R^1$ is selected from H, aryl, or $C_1$ to $C_{50}$ alkyl optionally having one or more non-contiguous $C=O$ or $NHC=O$ or $-S-$ or $-O-$ in the carbon chain, or the same as $R^2$;

each of $R^2$, $R^3$, and $R^4$ is the same or different and selected from H, $C_1$ to $C_{18}$ alkyl optionally substituted with one or more OH or from $-R^5-O)_a-H$ where a is an integer from 1 to 10 and $R^5$ is ethylene or propylene; and X is an anion selected from chloride, bromide, iodide, fluoride, nitrate, fluoborate, phosphate, $C_1$ to $C_8$ alkyl phosphate, sulfate, $C_1$ to $C_8$ alkyl sulfate, formate, $C_1$ to $C_8$ alkyl or $C_6$ to $C_{24}$ alkaryl or aryl sulfonate, acetate, citrate, trifluoroacetate, propionate, or tartrate, and (C) the organic base is of the formula 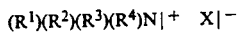, wherein $M|^+$ is $[R^6R^7R^8R^9N]^+$, where $R^6$, $R^7$, $R^8$, and $R^9$ are independently selected from a $C_1$ to $C_4$ alkyl, benzyl, 2-hydroxyethyl, or hydroxypropyl, and $Y^-$ is selected from hydroxide, $C_1$ to $C_4$ alkoxide, bicarbonate, or carbonate.

14. A semi-rigid, heat-sealable laminate with permanently anti-static characteristics comprising a planar, semi-rigid deformable substrate having a surface with a surface portion for supporting an item to be packaged, and a heat-sealable, permanently antistatic layer extending over and bonded to said surface, said layer obtained from mixing with heat, optionally with solvent, ethylene-acrylic acid or ethylenemethacrylic acid and a quaternary amine of the formula $[(R^1)(R^2)(R^3)(R^4)N \ +[X \ -$ where $R^1$ is a $C_4$ to $C_{30}$ straight or branched alkyl optionally including one or more ether linkages, each of $R^2$ and $R^3$ and $R^4$ is the same or different and selected from methyl or ethyl, and X is chloride, methyl sulfate, ethyl sulfate, methane sulfonate, or toluene sulfonate.

15. A package according to claim 14, wherein the permanently antistatic layer will, after a 24 hour water shower, after 12 day oven aging at 70° C., or after both, dissipate an applied charge of ±5000 Vdc in less than about 3000 ms without having being subjected to irradiation from an electron beam.

16. A semi-rigid, heat-sealable laminate with permanently antistatic characteristics comprising a planar, semi-rigid deformable substrate having a surface with a surface portion for supporting an item to be packaged, and a heat-sealable, permanently antistatic layer extending over and bonded to said surface, said layer obtained from mixing with heat, optionally with solvent, ethylene-acrylic acid or ethylenemethacrylic acid and an organic base of the formula $M|^+ \ Y|^-$ where $M^+$ is $R^6R^7R^8R^9N^+$ wherein $R^6$, $R^7$, $R^8$, and $R^9$ are selected from methyl, ethyl, or $C_2H_4OH$, and $Y^-$ is hydroxide, methoxide, or ethoxide.

17. A package according to claim 16, wherein the permanently antistatic layer will, after a 24 hour water shower, after 12 day oven aging at 70° C. or after both, dissipate an applied charge of ±5000 Vdc in less than about 3000 ms.

18. A method for making a semi-rigid, antistatic, heat-sealable laminate with permanent antistatic characteristics comprising (1) modifying an acid copolymer by mixing with heat, optionally with solvent, (A) a polymer containing carboxylic acid moieties and an antistatically effective amount of a modifier selected from either (B) a quaternary amine or (C) an organic base wherein (A), (B), and (C) are defined as follows:

(A) the polymer containing carboxylic acid moieties is a copolymer of (i) an alpha-olefin of the formula $RCH=CH_2$ wherein R is H or $C_1$ to $C_{20}$ alkyl, $C_1$ to $C_{20}$ alkoxy, or $C_6$ aryl, and (ii) an alpha,beta-ethylenically unsaturated carboxylic acid, and (B) the quaternary amine is of the formula $$[(R^1)(R^2)(R^3)(R^4)N \ ^+[X \ -$$

wherein $R^1$ is selected from H, aryl, or $C_1$ to $C_{50}$ alkyl optionally having one or more non-contiguous $C=O$ or $NHC=O$ or $-S-$ or $-O-$ in the carbon chain, or the same as $R^2$;

each of $R^2$, $R^3$ and $R^4$ is the same or different and selected from H, $C_1$ to $C_{18}$ alkyl optionally substituted with one or more OH or from $-(R^5-O)_a-H$ where a is an integer from 1 to 10 and $R^5$ is ethylene or propylene; and X is an anion selected from chloride, bromide, iodide, fluoride, nitrate, fluoborate, phosphate, $C_1$ to $C_8$ alkyl phosphate, sulfate, $C_1$ to $C_8$ alkyl sulfate, formate, $C_1$ to $C_8$ alkyl or $C_y$ to $C_{24}$ alkaryl or aryl sulfonate, acetate, citrate, trifluoroacetate, propionate, or tartrate, and (C) the organic base is of the formula 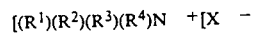, wherein $M^+$ is $[R^6R^7R^8R^9N]^+$, where $R^6$, $R^7$, $R^8$, and $R^9$ are independently selected from a $C_1$ to $C_4$ alkyl, benzyl, 2-hydroxyethyl, or hydroxypropyl, and Y⁻ is selected from hydroxide, $C_1$ to $C_4$ alkoxide, bicarbonate, or carbonate, and (2) applying a layer of said modified acid copolymer/quaternary amine mixture to a sheet of semi-rigid substrate.

19. The method of claim 18, wherein said layer is a permanently antistatic film which will, after a 24-hour water shower, after a 12 day oven at 70° C., or after both, dissipate an applied charge of ±5000 Vdc in less than about 3000 milliseconds.

* * * * *